US010230432B2

(12) United States Patent
Wloczysiak

(10) Patent No.: US 10,230,432 B2
(45) Date of Patent: Mar. 12, 2019

(54) DIVERSITY MODULES FOR PROCESSING RADIO FREQUENCY SIGNALS

(71) Applicant: SKYWORKS SOLUTIONS, INC., Woburn, MA (US)

(72) Inventor: Stephane Richard Marie Wloczysiak, Irvine, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 35 days.

(21) Appl. No.: 15/482,614

(22) Filed: Apr. 7, 2017

(65) Prior Publication Data

US 2017/0230088 A1 Aug. 10, 2017

Related U.S. Application Data

(62) Division of application No. 14/670,836, filed on Mar. 27, 2015, now Pat. No. 9,654,169.

(Continued)

(51) Int. Cl.
*H04B 7/0404* (2017.01)
*H04W 52/52* (2009.01)
(Continued)

(52) U.S. Cl.
CPC .......... *H04B 7/0404* (2013.01); *H04B 1/006* (2013.01); *H04B 1/0057* (2013.01);
(Continued)

(58) Field of Classification Search
USPC ..................... 455/78; 370/273, 335; 375/349
See application file for complete search history.

(56) References Cited

U.S. PATENT DOCUMENTS 9,602,156 B2   3/2017   Wloczysiak
9,654,169 B2   5/2017   Wloczysiak
(Continued)

FOREIGN PATENT DOCUMENTS

CN   102570027 A   7/2012
CN   103178358 A   6/2013
(Continued)

OTHER PUBLICATIONS

Examination Report for United Kingdom Patent Application No. GB1506073.4 dated Sep. 26, 2016 in 3 pages.

(Continued)

*Primary Examiner* — Ganiyu A Hanidu
(74) *Attorney, Agent, or Firm* — Knobbe Martens Olson & Bear LLP

(57) ABSTRACT

Diversity modules for processing radio frequency (RF) signals are provided herein. In certain implementations a diversity module includes a first terminal, a second terminal, a low band processing circuit that generates a low band signal based on one or more diversity signals, a mid band processing circuit that generates a mid band signal based on the one or more diversity signals and that provides the mid band signal to the second terminal, a high band processing circuit that generates a high band signal based on the one or more diversity signals, and a multi-throw switch that provides the low band signal to the first terminal in a first state and that provides the high band signal to the first terminal in a second state.

20 Claims, 8 Drawing Sheets

Related U.S. Application Data

(60) Provisional application No. 61/982,669, filed on Apr. 22, 2014.

(51) Int. Cl.

| | | |
|---|---|---|
| *H04B 7/08* | (2006.01) | |
| *H04B 1/44* | (2006.01) | |
| *H04B 1/401* | (2015.01) | |
| *H04B 7/06* | (2006.01) | |
| *H04B 1/00* | (2006.01) | |
| *H04B 1/04* | (2006.01) | |

(52) U.S. Cl.
CPC ......... *H04B 1/0064* (2013.01); *H04B 1/0458* (2013.01); *H04B 1/401* (2013.01); *H04B 1/44* (2013.01); *H04B 7/0602* (2013.01); *H04B 7/0604* (2013.01); *H04B 7/0802* (2013.01); *H04W 52/52* (2013.01)

(56) References Cited

U.S. PATENT DOCUMENTS

| | | | |
|---|---|---|---|
| 9,985,680 B2 | 5/2018 | Wloczysiak | |
| 2004/0102172 A1 | 5/2004 | Hendin | |
| 2005/0277387 A1 | 12/2005 | Kojima et al. | |
| 2006/0252380 A1 | 11/2006 | Khayrallah et al. | |
| 2007/0249312 A1 | 10/2007 | Shatara et al. | |
| 2008/0224927 A1 | 9/2008 | De Abreu | |
| 2009/0003286 A1* | 1/2009 | Korden | H01Q 1/50 370/335 |
| 2009/0160430 A1* | 6/2009 | Brown | G01R 23/16 324/76.23 |
| 2009/0285135 A1 | 11/2009 | Rousu et al. | |
| 2010/0022197 A1 | 1/2010 | Kato et al. | |
| 2010/0157858 A1 | 6/2010 | Lee et al. | |
| 2010/0260082 A1 | 10/2010 | Lum et al. | |
| 2011/0210787 A1 | 9/2011 | Lee et al. | |
| 2012/0052822 A1 | 3/2012 | Monroe | |
| 2012/0112969 A1 | 5/2012 | Caballero et al. | |
| 2012/0300245 A1 | 11/2012 | Chatierjee et al. | |
| 2012/0327825 A1 | 12/2012 | Gudem et al. | |
| 2013/0037924 A1 | 2/2013 | Lee et al. | |
| 2013/0051284 A1 | 2/2013 | Khlat | |
| 2013/0109333 A1 | 5/2013 | Rowson et al. | |
| 2013/0162486 A1 | 6/2013 | Korva et al. | |
| 2013/0321095 A1 | 12/2013 | Lam et al. | |
| 2013/0335160 A1* | 12/2013 | Khlat | H01P 1/15 333/103 |
| 2014/0003300 A1* | 1/2014 | Weissman | H04B 7/0404 370/273 |
| 2014/0105079 A1 | 4/2014 | Bengtsson et al. | |
| 2014/0133364 A1 | 5/2014 | Weissman et al. | |
| 2015/0126136 A1 | 5/2015 | Robinett et al. | |
| 2015/0236887 A1* | 8/2015 | Kaukovuori | H04L 27/2647 375/349 |
| 2017/0155421 A1 | 6/2017 | Wloczysiak | |

FOREIGN PATENT DOCUMENTS

| | | |
|---|---|---|
| CN | 103390796 A | 11/2013 |
| EP | 2523355 A1 | 11/2012 |
| EP | 2720378 A1 | 4/2014 |
| JP | 2003-032140 A | 1/2003 |
| JP | 2003-087023 A | 3/2003 |
| JP | 2003-169008 A | 6/2003 |
| JP | 2009-016921 A | 1/2009 |
| JP | 2010-252346 A | 11/2010 |
| JP | 2012-105334 A | 5/2012 |
| WO | WO 2013/041146 A1 | 3/2013 |
| WO | WO 2013/13105 A1 | 9/2013 |
| WO | WO 2014/088218 A1 | 6/2014 |
| WO | WO 2015/117433 A1 | 8/2015 |

OTHER PUBLICATIONS

Combined Search and Examination Report for United Kingdom Patent Application No. GB1612522.1 dated Sep. 26, 2016 in 6 pages.
Combined Search and Examination Report for United Kingdom Patent Application No. GB1612523.9 dated Sep. 26, 2016 in 4 pages.

* cited by examiner

DIVERSITY MODULES FOR PROCESSING RADIO FREQUENCY SIGNALS

CROSS-REFERENCE TO RELATED APPLICATIONS

The present application is a divisional of U.S. application Ser. No. 14/670,836, filed Mar. 27, 2015, titled "APPARATUS AND METHODS FOR MULTI-BAND RADIO FREQUENCY SIGNAL ROUTING," which claims the benefit of priority under 35 U.S.C. § 119(e) of U.S. Provisional Patent Application No. 61/982,669, filed Apr. 22, 2014 and titled "APPARATUS AND METHODS FOR MULTI-BAND RADIO FREQUENCY SIGNAL ROUTING," which is herein incorporated by reference in its entirety.

BACKGROUND

Field

Embodiments of the invention relate to electronic systems, and in particular, to radio frequency (RF) electronics.

Description of the Related Technology

An RF system can include antennas for receiving and/or transmitting RF signals. However, there can be several components in an RF system that may need to access to the antennas. For example, an RF system can include different transmit or receive paths associated with different frequency bands, different communication standards, and/or different power modes, and each path may need access to a particular antenna at certain instances of time.

An antenna switch module can be used to electrically connect a particular antenna to a particular transmit or receive path of the RF system, thereby allowing multiple components to share antennas. In certain configurations, an antenna switch module is in communication with a diversity module, which processes signals that are received and/or transmitted using one or more diversity antennas.

SUMMARY

In certain embodiments, the present disclosure relates to a mobile device. The mobile device includes at least one diversity antenna, a diversity module electrically coupled to the at least one diversity antenna, and an antenna switch module. The diversity module is electrically coupled to the at least one diversity antenna, and is configured to generate a high band (HB) signal, a mid band (MB) signal, and a low band (LB) signal based on processing one or more diversity signals received from the at least one diversity antenna. The HB signal has a frequency content that is greater than a frequency content of the MB signal and the MB signal has a frequency content that is greater than a frequency content of the LB signal. The diversity module is further configured to generate a combined LB/HB signal based on combining the LB signal and the HB signal. The antenna switch module is configured to receive the MB signal and the combined LB/HB signal from the diversity module.

In a number of embodiments, the frequency content of the LB signal is less than 1 GHz, the frequency content of the MB signal is between 1 GHz and 2.3 GHz, and the frequency content of the HB signal is greater than 2.3 GHz.

In various embodiments, the mobile device further includes a transceiver and one or more primary antennas, and the transceiver is electrically coupled to the one or more primary antennas via the antenna switch module.

In some embodiments, the diversity module includes a diplexer configured to generate the combined LB/HB signal based on the LB signal and the HB signal.

Accordingly to certain embodiments, the diversity module includes a LB processing circuit configured to generate the LB signal, a MB processing circuit configured to generate the MB signal, and a HB processing circuit configured to generate the HB signal.

In some embodiments, the LB processing circuit includes a first filter and a first LNA arranged in a cascade, the MB processing circuit includes a second filter and a second LNA arranged in a cascade, and the HB processing circuit includes a third filter and a third LNA arranged in a cascade.

In various embodiments, the mobile device further includes a diversity antenna terminal configured to receive a combined MB/HB diversity signal, and a band selection switch including an input electrically coupled to the diversity antenna terminal, a first output electrically coupled to an input of the MB processing circuit, and a second output electrically coupled to an input of the HB processing circuit.

In certain embodiments, the present disclosure relates to a method of front end signal processing in a mobile device. The method includes receiving one or more diversity signals from at least one diversity antenna and generating a HB signal, a MB signal, and a LB signal based on processing the one or more diversity signals using a diversity module. The HB signal has a frequency content that is greater than a frequency content of the MB signal, and the MB signal has a frequency content that is greater than a frequency content of the LB signal. The method further includes generating a combined LB/HB signal based on combining the LB signal and the HB signal using the diversity module, providing the MB signal to an antenna switch module over a first signal route, and providing the combined LB/HB signal to the antenna switch module over a second signal route.

According to a number of embodiments, the frequency content of the LB signal is less than 1 GHz, the frequency content of the MB signal is between 1 GHz and 2.3 GHz, and the frequency content of the HB signal is greater than 2.3 GHz.

In various embodiments, the method further includes receiving one or more primary signals from at least one primary antenna, and providing the one or more primary signals to the antenna switch module.

In some embodiments generating the combined LB/HB signal includes combining the LB signal and the HB signal using a diplexer.

In certain embodiments, the present disclosure relates to a diversity module for a mobile device. The diversity module includes a LB processing circuit configured to generate a LB signal based on processing one or more diversity signals, a MB processing circuit configured to generate a MB signal based on processing the one or more diversity signals, and a HB processing circuit configured to generate a HB signal based on processing the one or more diversity signals. The MB signal has a frequency content that is greater than a frequency content of the LB signal, and the HB signal has a frequency content that is greater than a frequency content of the MB signal. The diversity module further includes a MB terminal configured to receive the MB signal, a shared LB/HB terminal, and a multi-throw switch electrically coupled to the shared LB/HB terminal. The multi-throw switch is configured to provide the LB signal to the shared LB/HB terminal in a first state and to provide the HB signal to the shared LB/HB terminal in a second state.

According to various embodiments, the frequency content of the LB signal is less than 1 GHz, the frequency content of the MB signal is between 1 GHz and 2.3 GHz, and the frequency content of the HB signal is greater than 2.3 GHz.

In some embodiments, the diversity module further includes a diplexer configured to combine the LB signal and the HB signal to generate a combined LB/HB signal, and the multi-throw switch is configured to provide the combined LB/HB signal to the shared LB/HB terminal in a third state. In certain embodiments, the diversity module further includes a first switch electrically coupled between an output of the HB processing circuit and a first input of the diplexer, and a second switch electrically coupled between an output of the LB processing circuit and a second input of the diplexer. In various embodiments, the first and second switches are configured to close when the multi-throw switch operates in the third state and to open when the multi-throw switch operates in the first or second states.

In a number of embodiments, the LB processing circuit includes a first filter and a first LNA arranged in a cascade, the MB processing circuit includes a second filter and a second LNA arranged in a cascade, and the HB processing circuit includes a third filter and a third LNA arranged in a cascade.

In various embodiments, the diversity module further includes a first diversity antenna terminal configured to receive a LB diversity signal, and the first diversity antenna terminal is electrically coupled to an input of the LB processing circuit. In some embodiments, the diversity module further includes a second diversity antenna terminal configured to receive a combined MB/HB diversity signal, and a band selection switch including an input electrically coupled to the second diversity antenna terminal, a first output electrically coupled to an input of the MB processing circuit, and a second output electrically coupled to an input of the HB processing circuit.

According to some embodiments, the LB processing circuit includes a plurality of low band filters having different frequency ranges, the MB processing circuit includes a plurality of mid band filters having different frequency ranges, and the HB processing circuit includes a plurality of high band filters having different frequency ranges.

In certain embodiments, the present disclosure relates to a diversity module. The diversity module includes a first antenna-side multi-throw switch, a second antenna-side multi-throw switch, a first transceiver-side multi-throw switch, a second transceiver-side multi-throw switch, a LB processing circuit configured to generate a LB signal, a MB processing circuit configured to generate a MB signal having a frequency content that is greater than a frequency content of the LB signal, and a HB processing circuit configured to generate a HB signal having a frequency content that is greater than the frequency content of the MB signal. The LB processing circuit is electrically coupled in a first signal path between the first antenna-side multi-throw switch and the first transceiver-side multi-throw switch, the MB processing circuit electrically coupled in a second signal path between the second antenna-side multi-throw switch and the second transceiver-side multi-throw switch, and the HB processing circuit is electrically coupled in a third signal path between the second antenna-side multi-throw switch and the first transceiver-side multi-throw switch.

In a number of embodiments, the frequency content of the LB signal is less than 1 GHz, the frequency content of the MB signal is between 1 GHz and 2.3 GHz, and the frequency content of the HB signal is greater than 2.3 GHz.

In various embodiments, the diversity module further includes a first transmit bypass path between the first transceiver-side multi-throw switch and the first antenna-side multi-throw switch, and a second transmit bypass path between the second transceiver-side multi-throw switch and the second antenna-side multi-throw switch.

According to certain embodiments, the diversity module is operable in a plurality of modes including a normal operating mode and a swap mode. Additionally, the first transceiver-side multi-throw switch and the first antenna-side multi-throw switch are configured to select the first transmit bypass path in the swap mode, and the second transceiver-side multi-throw switch and the second antenna-side multi-throw switch are configured to select the second transmit bypass path in the swap mode.

In some embodiments, the diversity module further includes a first diversity antenna terminal electrically coupled to the first antenna-side multi-throw switch, a second diversity antenna terminal electrically coupled to the second antenna-side multi-throw switch, a first bidirectional terminal electrically coupled to the first transceiver-side multi-throw switch, and a second bidirectional terminal electrically coupled to the second transceiver-side multi-throw switch.

In various embodiments, the diversity module is operable in a plurality of modes including a normal operating mode and a swap mode, and the first transceiver-side multi-throw switch is configured to provide one of the LB signal or the HB signal to the first bidirectional terminal in the normal operating mode, and the second transceiver-side multi-throw switch is configured to provide MB signal to the second bidirectional terminal in the normal operating mode.

In some embodiments, the first transceiver-side multi-throw switch and the first antenna-side multi-throw switch are configured to electrically couple the first bidirectional terminal to the first diversity antenna terminal via the first transmit bypass path in the swap mode, and the second transceiver-side multi-throw switch and the second antenna-side multi-throw switch are configured to electrically couple the second bidirectional terminal to the second diversity antenna terminal via the second transmit bypass path in the swap mode.

According to a number of embodiments, the LB processing circuit includes a first filter and a first LNA arranged in a cascade, the MB processing circuit includes a second filter and a second LNA arranged in a cascade, and the HB processing circuit includes a third filter and a third LNA arranged in a cascade.

In certain embodiments, the present disclosure relates to a mobile device. The mobile device includes a transceiver, an antenna switch module, at least one diversity antenna, and a diversity module that includes a transceiver-side and an antenna-side. The diversity module is electrically coupled to the transceiver via the antenna switch module on the transceiver-side and is electrically coupled to the at least one diversity antenna on the antenna-side. The diversity module includes a first antenna-side multi-throw switch, a second antenna-side multi-throw switch, a first transceiver-side multi-throw switch, a second transceiver-side multi-throw switch, a LB processing circuit, a MB processing circuit, and a HB processing circuit. The LB processing circuit is electrically coupled in a first signal path between the first antenna-side multi-throw switch and the first transceiver-side multi-throw switch, the MB processing circuit is electrically coupled in a second signal path between the second antenna-side multi-throw switch and the second transceiver-side multi-throw switch, and the HB processing circuit is electrically coupled in a third signal path between the second antenna-side multi-throw switch and the first transceiver-side multi-throw switch.

In various embodiments, the LB processing circuit is configured to generate a LB signal based on processing one or more diversity signals received from the at least one diversity antenna, the MB processing circuit is configured to generate a MB signal having a frequency content that is greater than a frequency content of the LB signal based on processing the one or more diversity signals, and the HB processing circuit is configured to generate a HB signal having a frequency content that is greater than the frequency content of the MB signal based on processing the one or more diversity signals.

In certain embodiments, the frequency content of the LB signal is less than 1 GHz, the frequency content of the MB signal is between 1 GHz and 2.3 GHz, and the frequency content of the HB signal is greater than 2.3 GHz.

According to some embodiments, the diversity module further includes a first transmit bypass path between the first transceiver-side multi-throw switch and the first antenna-side multi-throw switch, and a second transmit bypass path between the second transceiver-side multi-throw switch and the second antenna-side multi-throw switch.

In various embodiments, the diversity module is operable in a plurality of modes including a normal operating mode and a swap mode, the first transceiver-side multi-throw switch and the first antenna-side multi-throw switch configured to select the first transmit bypass path in the swap mode, and the second transceiver-side multi-throw switch and the second antenna-side multi-throw switch configured to select the second transmit bypass path in the swap mode.

In certain embodiments, the first transceiver-side multi-throw switch is configured to select an output of the HB processing circuit or an output of the LB processing circuit in the normal operating mode, and the second transceiver-side multi-throw switch is configured to select an output of the MB processing circuit in the normal operating mode.

In various embodiments, the LB processing circuit includes a first filter and a first LNA arranged in a cascade, the MB processing circuit includes a second filter and a second LNA arranged in a cascade, and the HB processing circuit includes a third filter and a third LNA arranged in a cascade.

According to certain embodiments, the mobile device further includes one or more primary antennas, and the transceiver is electrically coupled to the one or more primary antennas via the antenna switch module.

In certain embodiments, the present disclosure relates to a method of signal processing in a diversity module. The method includes receiving one or more diversity signals using at least one diversity antenna, and generating a LB signal based on processing the one or more diversity signals using a LB processing circuit that is electrically coupled in a first signal path between a first antenna-side multi-throw switch and a first transceiver-side multi-throw switch. The method further includes generating a MB signal based on processing the one or more diversity signals using a MB processing circuit that is electrically coupled in a second signal path between a second antenna-side multi-throw switch and a second transceiver-side multi-throw switch, the MB signal having a frequency content that is greater than a frequency content of the LB signal. The method further includes generating a HB signal based on processing the one or more diversity signals using a HB processing circuit that is electrically coupled in a third signal path between the second antenna-side multi-throw switch and the first transceiver-side multi-throw switch, the HB signal having a frequency content that is greater than the frequency content of the MB signal.

In various embodiments, the method further includes operating the diversity module in one of a plurality of operating modes including a normal operating mode and a bypass mode, selecting the LB signal or the HB signal using the first transceiver-side multi-throw switch when the diversity module is in the normal operating mode, and selecting the MB signal using the second transceiver-side multi-throw switch when the diversity module is in the normal operating mode.

According to some embodiments, the method further includes selecting the first transmit bypass path using the first transceiver-side multi-throw switch and the first antenna-side multi-throw switch when the diversity module is in the swap mode, and selecting the second transmit bypass path using the second transceiver-side multi-throw switch and the second antenna-side multi-throw switch when the diversity module is in the swap mode.

In a number of embodiments, the frequency content of the LB signal is less than 1 GHz, the frequency content of the MB signal is between 1 GHz and 2.3 GHz, and the frequency content of the HB signal is greater than 2.3 GHz.

DETAILED DESCRIPTION OF EMBODIMENTS

The headings provided herein, if any, are for convenience only and do not necessarily affect the scope or meaning of the claimed invention.

Figure 1:
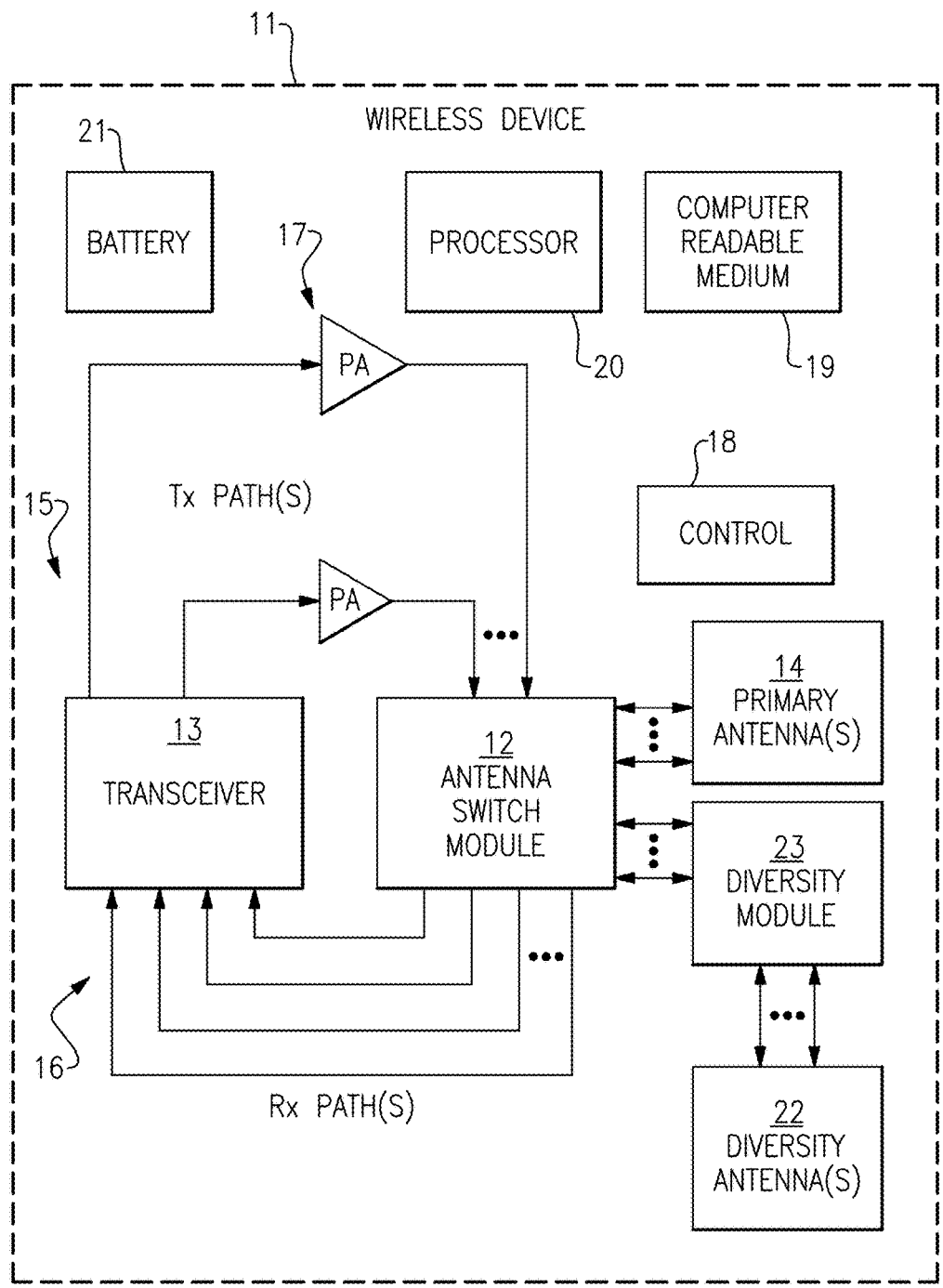
FIG. 1 is a schematic block diagram of one example of a wireless device.

FIG. 1 is a schematic block diagram of one example of a wireless or mobile device 11. The mobile device 11 can include radio frequency (RF) modules implementing one or more features of the present disclosure.

The example mobile device 11 depicted in FIG. 1 can represent a multi-band and/or multi-mode device such as a multi-band/multi-mode mobile phone. By way of examples, Global System for Mobile (GSM) communication standard is a mode of digital cellular communication that is utilized in many parts of the world. GSM mode mobile phones can operate at one or more of four frequency bands: 850 MHz (approximately 824-849 MHz for Tx, 869-894 MHz for Rx), 900 MHz (approximately 880-915 MHz for Tx, 925-960 MHz for Rx), 1800 MHz (approximately 1710-1785 MHz for Tx, 1805-1880 MHz for Rx), and 1900 MHz (approximately 1850-1910 MHz for Tx, 1930-1990 MHz for Rx). Variations and/or regional/national implementations of the GSM bands are also utilized in different parts of the world.

Code division multiple access (CDMA) is another standard that can be implemented in mobile phone devices. In certain implementations, CDMA devices can operate in one or more of 800 MHz, 900 MHz, 1800 MHz and 1900 MHz bands, while certain W-CDMA and Long Term Evolution (LTE) devices can operate over, for example, 22 or more radio frequency spectrum bands.

RF modules of the present disclosure can be used within a mobile device implementing the foregoing example modes and/or bands, and in other communication standards. For example, 3G, 4G, LTE, and Advanced LTE are non-limiting examples of such standards.

In the illustrated embodiment, the mobile device 11 includes an antenna switch module 12, a transceiver 13, one or more primary antennas 14, power amplifiers 17, a control component 18, a computer readable medium 19, a processor 20, a battery 21, one or more diversity antennas 22, and a diversity module 23.

The transceiver 13 can generate RF signals for transmission via the primary antenna(s) 14 and/or the diversity antenna(s) 22. Furthermore, the transceiver 13 can receive incoming RF signals from the primary antenna(s) 14 and/or the diversity antenna(s) 22. It will be understood that various functionalities associated with transmitting and receiving of RF signals can be achieved by one or more components that are collectively represented in FIG. 1 as the transceiver 13. For example, a single component can be configured to provide both transmitting and receiving functionalities. In another example, transmitting and receiving functionalities can be provided by separate components.

In FIG. 1, one or more output signals from the transceiver 13 are depicted as being provided to the antenna switch module 12 via one or more transmission paths 15. In the example shown, different transmission paths 15 can represent output paths associated with different bands and/or different power outputs. For instance, the two different paths shown can represent paths associated with different power outputs (e.g., low power output and high power output), and/or paths associated with different bands. The transmit paths 15 can include one or more power amplifiers 17 to aid in boosting a RF signal having a relatively low power to a higher power suitable for transmission. Although FIG. 1 illustrates a configuration using two transmission paths 15, the mobile device 11 can be adapted to include more or fewer transmission paths 15.

In FIG. 1, one or more receive signals are depicted as being provided from the antenna switch module 12 to the transceiver 13 via one or more receiving paths 16. In the example shown, different receiving paths 16 can represent paths associated with different bands. For example, the four example paths 16 shown can represent quad-band capability that some mobile devices are provided with. Although FIG. 1 illustrates a configuration using four receiving paths 16, the mobile device 11 can be adapted to include more or fewer receiving paths 16.

To facilitate switching between receive and/or transmit paths, the antenna switch module 12 can be used to electrically connect a particular antenna to a selected transmit or receive path. Thus, the antenna switch module 12 can provide a number of switching functionalities associated with operation of the mobile device 11. The antenna switch module 12 can include one or more multi-throw switches configured to provide functionalities associated with, for example, switching between different bands, switching between different power modes, switching between transmission and receiving modes, or some combination thereof. The antenna switch module 12 can also be configured to provide additional functionality, including filtering and/or duplexing of signals.

FIG. 1 illustrates that in certain embodiments, the control component 18 can be provided for controlling various control functionalities associated with operations of the antenna switch module 12, the diversity module 23, and/or other operating component(s). For example, the control component 18 can provide control signals to the antenna switch module 12 and/or the diversity module 23 to control electrical connectivity to the primary antenna(s) 14 and/or diversity antenna(s) 22, for instance, by setting states of switches.

In certain embodiments, the processor 20 can be configured to facilitate implementation of various processes on the mobile device 11. The processor 20 can be a general purpose computer, special purpose computer, or other programmable data processing apparatus. In certain implementations, the mobile device 11 can include a computer-readable memory 19, which can include computer program instructions that may be provided to and executed by the processor 20.

The battery 21 can be any suitable battery for use in the mobile device 11, including, for example, a lithium-ion battery.

The illustrated mobile device 11 includes the diversity antenna(s) 22, which can help improve the quality and reliability of a wireless link relative to a configuration in which a mobile device only includes primary antenna(s). For example, including the diversity antenna(s) 22 can reduce line-of-sight losses and/or mitigate the impacts of phase shifts, time delays, and/or distortions associated with signal interference of the primary antenna(s) 14.

As shown in FIG. 1, the diversity module 23 is electrically coupled to the diversity antenna(s) 22. The diversity module 23 can be used to process signals received and/or signals transmitted using the diversity antenna(s) 22. In certain configurations, the diversity module 23 can be used to provide filtering, amplification, switching, and/or other processing.

Examples of Diversity Modules with Shared Low Band and High Band Terminal

Using one or more primary antennas and one or more diversity antennas in a mobile device can improve quality of signal reception. For example, the diversity antenna(s) can provide additional sampling of radio frequency (RF) signals in the vicinity of the mobile device. Additionally, a mobile device's transceiver can be implemented to process the signals received by the primary and diversity antennas to obtain a receive signal of higher energy and/or improved fidelity relative to a configuration using only primary antenna(s).

To reduce the correlation between signals received by the primary and diversity antennas and/or to enhance antenna isolation, the primary and diversity antennas can be separated by a relatively large physical distance in the mobile device. For example, the diversity antenna(s) can be positioned near the top of the mobile device and the primary antenna(s) can be positioned near the bottom of the mobile device or vice-versa.

The mobile device's transceiver can transmit or receive signals using the primary antenna(s), which the transceiver can communicate with via an antenna switch module. To meet or exceed signal communication specifications, the transceiver, the antenna switch module, and/or the primary antenna(s) can be in relatively close physical proximity to one another in the mobile device. Configuring the mobile device in this manner can provide relatively small signal loss, low noise, and/or high isolation. Additionally, the diversity antenna(s) may be located at a relatively far physical distance from the antenna switch module.

To help send diversity signals received on the diversity antenna(s) to the antenna switch module, the mobile device can include a diversity module for providing amplification, filtering, and/or other processing to the diversity signals. The processed diversity signals can be sent from the diversity module to the antenna switch module via RF signal routes, which can include phone board trace and/or cables.

Mobile devices can operate using a large number of bands that are separated over a wide range of frequency. For example, certain mobile devices can operate using one or more low bands (for example, RF signal bands having a frequency of 1 GHz or less), one or more mid bands (for example, RF signal bands having a frequency between 1 GHz and 2.3 GHz), and one or more high bands (for example, RF signal bands having a frequency greater than 2.3 GHz). To aid in communicating over a wide frequency range that includes high, mid, and low bands, certain mobile devices can include multiple primary antennas and/or multiple diversity antennas implemented to provide high performance operation to certain bands. However, other configurations are possible, such as implementations using one primary antenna and/or one diversity antenna. In such configurations, the mobile device can include a diplexer or other suitable circuitry for separating signals associated with different frequency bands.

Provided herein are apparatus and methods for multi-band RF signal routing. In certain configurations, a mobile device includes an antenna switch module, a diversity module, and one or more diversity antennas. The diversity module is electrically coupled to the one or more diversity antennas, and processes diversity signals received on the one or more diversity antennas to generate a high band (HB) signal, a mid band (MB) signal, and a low band (LB) signal. Additionally, the diversity module generates a combined LB/HB signal based on combining the LB signal and the HB signal, and provides the MB signal and the combined LB/HB signal to the antenna switch module.

The teachings herein can be used to reduce a number of RF signals that are routed in a mobile device. For example, configuring the diversity module to output a combined LB/HB signal can reduce a number of traces on a phone board and/or cables used to route RF signals. Decreasing routing congestion and/or a number of RF signal routes can reduce a mobile device's size and/or cost.

Thus, in contrast to a diversity module the generates separate diversity signals for low band, mid band, and high band, the diversity modules herein can generate a combined LB/HB signal, which is routed over a shared RF signal path to the antenna switch module.

Additionally, the diversity modules herein can provide enhanced performance relative to a diversity module that generates a single diversity signal that combines low band, mid band, and high band frequency content. For example, the frequency content of such a diversity signal may be degraded and/or signal content associated with different frequency bands may mix when sending the diversity signal from the diversity module to the antenna switch module over a relatively long RF signal route that may operate non-ideally. In contrast, a combined LB/HB signal includes separation in frequency between the low band and high band, and thus the fidelity of the combined LB/HB signal can be maintained when providing the signal from the diversity module to the antenna switch module. Thus, configuring the diversity module to output a MB signal and a combined LB/HB signal advantageously reduces routing congestion and/or a number of RF signal routes while maintaining robust signal quality for diversity signals.

Figure 2:
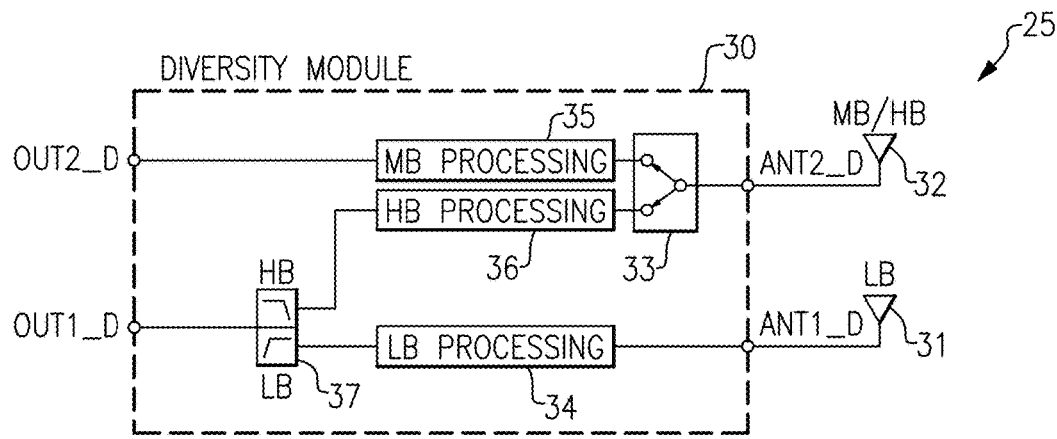
FIG. 2 is a schematic block diagram of a radio frequency (RF) system according to one embodiment.

FIG. 2 is a schematic block diagram of an RF system 25 according to one embodiment. The RF system 25 includes a diversity module 30, a first or low band (LB) diversity antenna 31, and a second or combined mid band/high band (MB/HB) diversity antenna 32.

Although not illustrated in FIG. 2 for clarity, the RF system 25 can include additional structures, such as additional circuitry, terminals, and/or components. For instance, the RF system 25 can represent a portion of a mobile device, such as the mobile device 11 of FIG. 1. In certain configurations, the diversity module 30 can operate in a radio frequency front end (RFFE) of the mobile device.

The illustrated diversity module 30 includes a band selection switch 33, a LB processing circuit 34, a MB processing circuit 35, a HB processing circuit 36, and a LB/HB diplexer 37. Additionally, the diversity module 30 includes a first diversity antenna terminal ANT1_D electrically coupled to the LB diversity antenna 31, a second diversity antenna terminal ANT2_D electrically coupled to the combined MB/HB diversity antenna 32, a first diversity output terminal OUT1_D, and a second diversity output terminal OUT2_D. Although not illustrated in FIG. 2 for clarity, the RF system 25 can include additional structures, such as additional circuitry, terminals, and/or components.

Although the diversity module 30 is described as including diversity output terminals, in certain configurations the first and/or second output terminals OUT1_D, OUT2_D can operate bidirectionally. For example, as will be described in further detail below, a diversity module can be configured to include a swap mode in which diversity output terminals are used to receive RF signals from a transceiver.

RF signals generated at the first and second diversity output terminals OUT1_D, OUT2_D can be routed from the diversity module 30 to other circuitry or components for further processing. In one embodiment, the diversity module 30 is electrically coupled to an antenna switch module using the first and second diversity output terminals OUT1_D, OUT2_D.

It can be desirable to reduce a number of RF signals that are routed in an RF system. For example, in a mobile device, it can be desired to reduce a number of traces on a printed circuit board (PCB) and/or cables used to route RF signals. Decreasing routing congestion and/or a number of RF signal routes can reduce a mobile device's size and/or cost.

In one example, a mobile device includes the diversity module 30, the diversity antennas 31, 32, an antenna switch module, and one or more primary antennas. To improve diversity of signals received by the LB diversity antenna 31 and the combined MB/HB diversity antenna 32 relative to those received by the primary antennas, the diversity module 30, the LB diversity antenna 31, and the combined MB/HB diversity antenna 32 can be located at a relatively large physical distance from the antenna switch module and the primary antennas. For instance, the diversity antennas and the primary antennas may be positioned on opposite sides or ends of the mobile device. To reduce RF signal routing in the mobile device, it can be desirable for the diversity module 30 to have a limited number of output terminals and associated RF signal routes.

Mobile devices can operate using a large number of bands. For example, certain mobile devices can operate using one or more low bands (for example, RF signal bands having a frequency of 1 GHz or less), one or more mid bands (for example, RF signal bands having a frequency between 1 GHz and 2.3 GHz), and one or more high bands (for example, RF signal bands having a frequency greater than 2.3 GHz).

The illustrated diversity module 30 can be used to process LB RF signals, MB RF signals, HB RF signals, or a combination thereof. For example, the LB diversity antenna 31 can be used to receive LB diversity signals, which can be processed using the LB processing circuit 34. Additionally, the combined MB/HB diversity antenna 32 can be used to receive both MB diversity signals and HB diversity signals. Furthermore, the MB processing circuit 35 can be used to process the received MB diversity signals, and the HB processing circuit 36 can be used to process the received HB diversity signals.

Certain mobile devices that communicate over a wide frequency range including high, mid, and low bands use multiple primary antennas and/or multiple diversity antennas that individually provide high performance operation across certain bands. For example, a particular antenna may be implemented to provide enhanced performance over certain frequency ranges that include one or more bands. However, other configurations are possible, such as implementations using one primary antenna and/or one diversity antenna.

As shown in FIG. 2, the band selection switch 33 includes an input electrically coupled to the combined MB/HB diversity antenna 32, a first output electrically coupled to an input of the HB processing circuit 36, and a second output electrically coupled to an input of the MB processing circuit 35. Additionally, the band selection switch 33 can be set in one a plurality of states. For example, the band selection switch 33 can be set in a first state in which the band selection switch 33 can provide a receive signal from the combined MB/HB diversity antenna 32 to the MB processing circuit 35 but not to the HB processing circuit 36. Additionally, the band selection switch 33 can be set in a second state in which the band selection 33 provides the receive signal from the combined MB/HB diversity antenna 32 to the HB processing circuit 36 but not to the MB processing circuit 35. Furthermore, the band selection switch 33 can be set in a third state in which the band selection switch 33 provides the receive signal from the combined MB/HB diversity antenna 32 to both the MB processing circuit 35 and the HB processing circuit 36.

Configuring the band selection switch 33 to include a state in which the receive signal from the combined MB/HB diversity antenna 32 is provided to both the MB processing circuit 35 and the HB processing circuit 36 can aid in providing carrier aggregation. For example, to operate a mobile device with wider bandwidth, the mobile device may communicate based on signals transmitted or received simultaneously across multiple frequency bands, including, for example, RF signals at both MB and HB frequencies. The RF signals can be aggregated to increase the mobile device's signal bandwidth.

As shown in FIG. 2, the LB processing circuit 34 is used to process a receive signal from the LB diversity antenna 31 to generate a LB signal. Additionally, the HB processing circuit 36 is used to process the first output of the band selection switch 33 to generate a HB signal. Furthermore, the LB/HB diplexer 37 is used to generate a combined LB/HB output signal on the first diversity output terminal OUT1_D by combining the LB signal and the HB signal. Additionally, the MB processing circuit 35 is used to process the second output of the band selection switch 33 to generate a MB signal on the second diversity output terminal OUT2_D.

Accordingly, in the illustrated configuration, the diversity module 30 can be used to process LB signals, MB signals, HB signals, and/or a combination thereof, while having a reduced number of output terminals. For example, the illustrated configuration includes a separate MB output terminal and a shared LB/HB output terminal, rather than including separate output terminals for each of LB, MB, and HB signals. The reduction in output terminals can lead to a reduction in a number of RF signals routed from the diversity module 30 to other components of a mobile device, such as an antenna switch module.

Accordingly, the diversity module 30 can be used to enhance the integration of a mobile device by reducing a number of RF signals that are routed, including, for example, a number of cables and/or PCB traces. Reducing routing congestion and/or a number of RF signal routes can reduce a mobile device's size and/or cost.

Additionally, the diversity module 30 can provide enhanced performance and/or lower cost relative to a configuration in which a diplexer is used to recombine MB and HB signals for communication over a shared MB/HB output terminal. For example, MB and HB signals can be spaced relatively closely in frequency, and it can be difficult to recombine two RF signals of close frequency spacing with low loss.

For example, a power combiner used to combine MB and HB signals may provide 3 dB of loss, which may not be acceptable for an RF front end specification. For instance, in a receiver 3 dB in loss from a power combiner can correspond to a 3 dB reduction in the receiver's sensitivity. Although a cavity filter and/or a surface acoustic wave (SAW) filter may provide sufficient frequency selectivity to recombine MB and HB signals, such filters can have a cost and/or size that can be prohibitive, particularly for mobile technology. The overhead of filtering can be exacerbated in configurations in which a mobile device operates using multiple high frequency bands and/or multiple mid frequency bands, since each band may utilize a separate filter.

Accordingly, the illustrated diversity module recombines LB and HB signals, while routing MB separately. The LB and HB signals generated by the LB and HB processing circuits 34, 36 can be recombined using a low loss and low cost diplexer, since a frequency separation between the LB and HB signals can be relatively large.

In one embodiment, the LB/HB diplexer 37 recombines LB signals having frequencies in the range of about 717 MHz to about 960 MHz with HB signals having frequencies in the range of about 2300 MHz to about 2690 MHz. Although one example of frequency ranges of the LB/HB diplexer has been provided, other configurations are possible.

Figure 3:
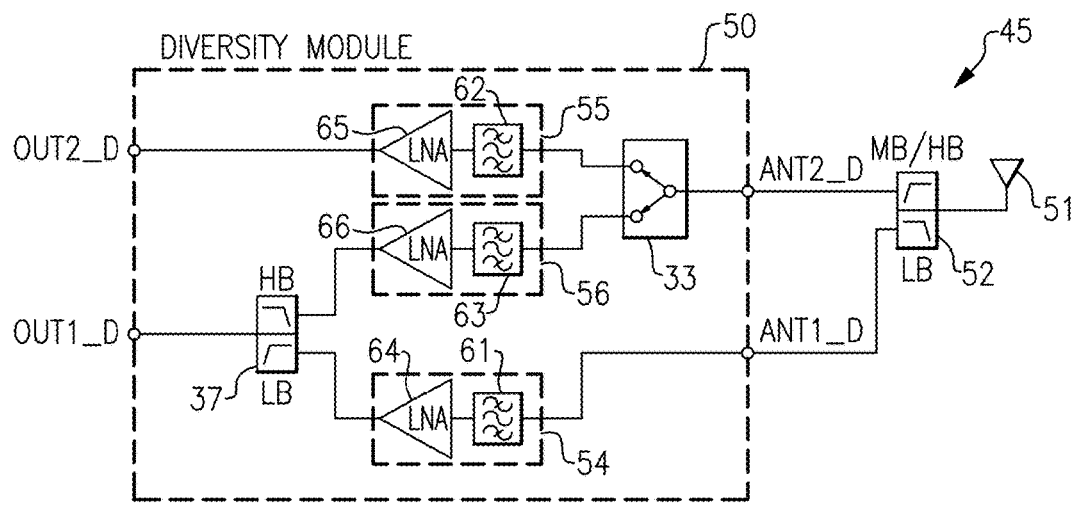
FIG. 3 is a schematic block diagram of an RF system according to another embodiment.

FIG. 3 is a schematic block diagram of an RF system 45 according to another embodiment. The RF system 45 includes a diversity module 50, a diversity antenna 51, and a diversity diplexer 52. The diversity diplexer 52 is electrically coupled to the diversity antenna 51, and is used to generate a MB/HB diversity receive signal and a LB diversity receive signal. As shown in FIG. 3, the MB/HB diversity receive signal is provided to a first diversity antenna terminal ANT1_D of the diversity module 50 and the LB receive signal is provided to a second diversity antenna terminal ANT2_D of the diversity module 50.

In contrast to the RF system 25 of FIG. 2, the RF system 45 of FIG. 3 is electrically coupled to only one diversity antenna, which has an output that is split into multiple diversity receive signals associated with different frequency bands.

In certain configurations, a diversity module can include multiple diversity antenna terminals, which can receive diversity signals from the same or different diversity antennas. For example, FIG. 2 illustrates a configuration including two diversity antenna terminals and two diversity antennas, while FIG. 3 illustrates a configuration including two diversity antenna terminals and one diversity antenna. Accordingly, the teachings herein are applicable both to diversity modules that operate in combination with one diversity antenna and to diversity modules that operate in combination with multiple diversity antennas.

The diversity module 50 includes the band selection switch 33, the LB/HB diplexer 37, the first and second diversity antenna terminals, ANT1_D, ANT2_D, and the first and second diversity output terminals OUT1_D, OUT2_D, which can be as described earlier. The diversity module 50 further includes a LB processing circuit 54, a MB processing circuit 55, and a HB processing circuit 56.

The diversity module 50 of FIG. 3 is similar to the diversity module 30 of FIG. 2, except that the diversity module 50 of FIG. 3 illustrates a specific configuration of LB, MB, and HB processing circuits. For example, the illustrated LB processing circuit 54 includes a cascade of a LB filter 61 and a first low noise amplifier (LNA) 64. Additionally, the illustrated MB processing circuit 55 includes a cascade of a MB filter 62 and a second LNA 65, and the illustrated HB processing circuit 56 includes a cascade of a HB filter 63 and a third LNA 66. Although one specific implementation of the LB, MB, and HB processing circuits has been shown in FIG. 3, other configurations are possible.

Additional details of the RF system 45 can be similar to those described earlier.

Figure 4:
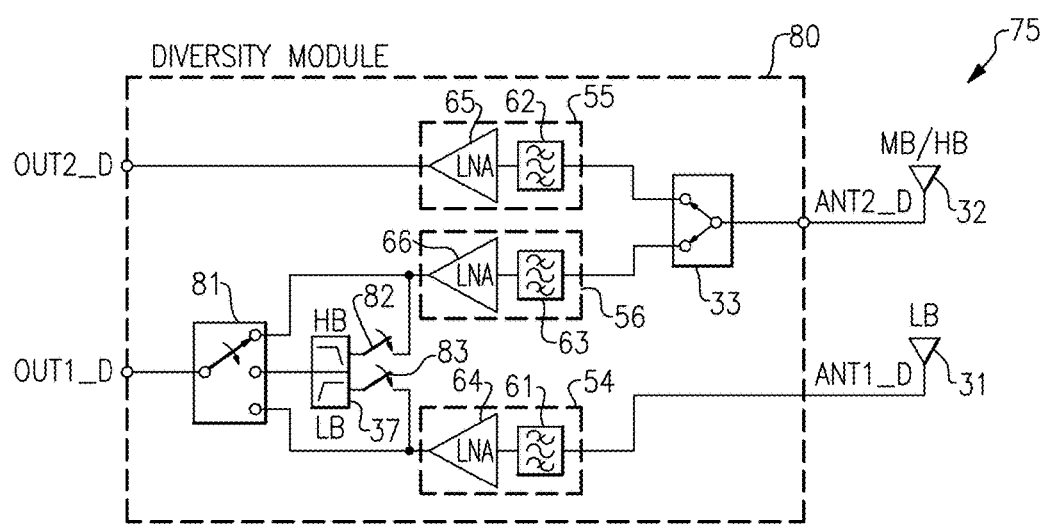
FIG. 4 is a schematic block diagram of an RF system according to another embodiment.

FIG. 4 is a schematic block diagram of an RF system 75 according to another embodiment. The RF system 75 includes a diversity module 80, the LB diversity antenna 31, and the combined MB/HB diversity antenna 32.

The RF system 75 of FIG. 4 is similar to the RF system 25 of FIG. 2, except that the RF system 75 includes a different configuration of a diversity module. For example, the diversity module 80 of FIG. 4 includes the band selection switch 33, the LB processing circuit 54, the MB processing circuit 55, the HB processing circuit 56, the LB/HB diplexer 37, first and second diversity antenna terminals, ANT1_D, ANT2_D, and first and second diversity output terminals OUT1_D, OUT2_D, which can be as described earlier. The RF system 75 of FIG. 4 further includes a single pole three throw (SP3T) switch 81, a first single pole single throw (SPST) switch 82, and a second SPST switch 83.

As described earlier, the band selection switch 33 can include a plurality of states, including a first state, a second state, and a third state. When in the first state, the band selection switch 33 can provide a receive signal from the combined MB/HB diversity antenna 32 to the MB processing circuit 55 but not to the HB processing circuit 56. Additionally, when in the second state, the band selection switch 33 can provide the receive signal from the combined MB/HB diversity antenna 32 to the HB processing circuit 56 but not to the MB processing circuit 55. Furthermore, when in the third state, the band selection switch 33 can provide the receive signal from the combined MB/HB diversity antenna 32 to both the MB processing circuit 55 and the HB processing circuit 56.

The SP3T switch 81 operates as a multi-throw switch that provides the LB signal to the first diversity output terminal OUT1_D in a first state, that provides the HB signal to the first diversity output terminal OUT1_D terminal in a second state, and that provides the combined LB/HB signal to the first diversity output terminal OUT1_D terminal in a third state.

The SP3T switch 81 and the first and second SPST switches 82, 83 can enhance the performance of the diversity module 80 of FIG. 4 relative to the configuration shown in FIG. 3. For example, when the diversity module 80 is processing both HB and LB signals, the first and second SPST switches 82, 83 can be closed, and the SP3T switch 81 can be set to electrically connect an output of the LB/HB diplexer 37 to the first diversity output terminal OUT1_D. However, when the diversity module 80 is processing HB signals but not LB signals, the first and second SPST switches 82, 83 can be opened, and the SP3T switch 81 can be set to electrically connect an output of the HB processing circuit 56 to the first diversity output terminal OUT1_D. Additionally, when the diversity module 80 is processing LB signals but not HB signals, the first and second SPST switches 82, 83 can be opened, and the SP3T switch 81 can be set to electrically connect an output of the LB processing circuit 54 to the first diversity output terminal OUT1_D.

Accordingly, the SP3T switch 81 and the first and second SPST switches 82, 83 can enhance the performance of the diversity module 80 by isolating the HB processing circuit's output from the LB/HB diplexer 37 when LB signals are not being processed, and by isolating the LB processing circuit's output from the LB/HB diplexer 37 when HB signals are not being processed.

Additional details of the RF system 75 can be similar to those described earlier.

Figure 5:
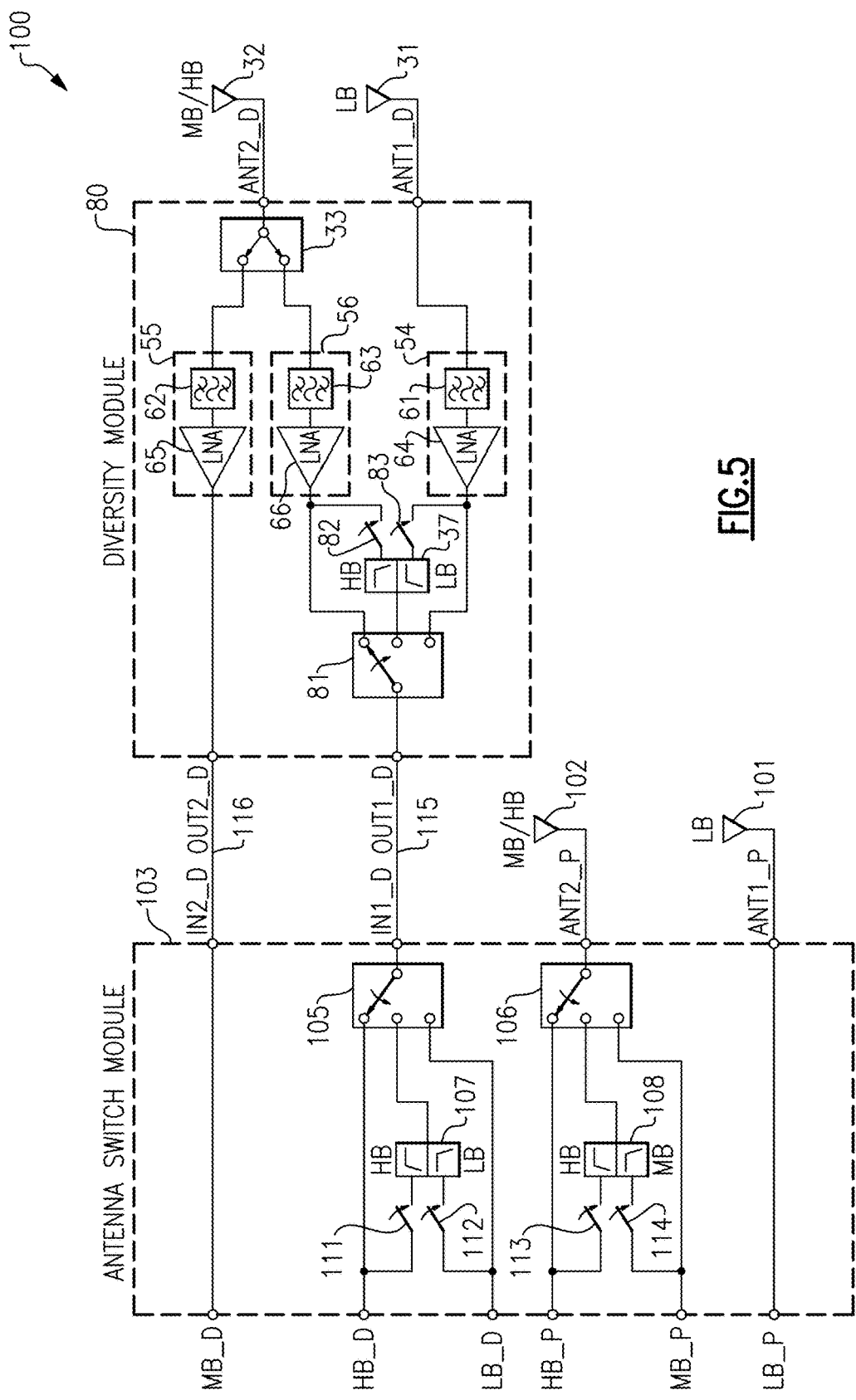
FIG. 5 is a schematic block diagram of one embodiment of an RF system including a diversity module and an antenna switch module.

FIG. 5 is a schematic block diagram of one embodiment of an RF system 100 including a LB primary antenna 101, a combined MB/HB primary antenna 102, a LB diversity antenna 31, a combined MB/HB diversity antenna 32, a diversity module 80, and an antenna switch module 103.

Although the RF system 100 of FIG. 5 is illustrated as including the diversity module 80 of FIG. 4, the RF system 100 of FIG. 5 can be implemented with other configurations of diversity modules, including, for example, the diversity modules shown in FIGS. 2 and 3. Additionally, the antenna switch module 103 can be implemented in other ways, and the RF system 100 can be adapted to include more or fewer primary antennas and/or diversity antennas.

The illustrated antenna switch module 103 includes a first SP3T switch 105, a second SP3T switch 106, a LB/HB diplexer 107, a MB/HB diplexer 108, a first SPST switch 111, a second SPST switch 112, a third SPST switch 113, and a fourth SPST switch 114. The antenna switch module 103 further includes a LB primary terminal LB_P, a MB primary terminal MB_P, a HB primary terminal HB_P, a LB diversity terminal LB_D, a MB diversity terminal MB_D, and a HB diversity terminal HB_D, which can be electrically coupled to a transceiver (not illustrated in FIG. 5). Additionally, the antenna switch module 103 further includes a first primary antenna terminal ANT1_P electrically coupled to the LB primary antenna 101, a second primary antenna terminal ANT2_P electrically coupled to the combined MB/HB primary antenna 102, a first diversity input terminal IN1_D electrically coupled to the first diversity output terminal OUT1_D of the diversity module 80, and a second diversity input terminal IN2_D electrically coupled to the second diversity output terminal OUT2_D of the diversity module 80.

As shown in FIG. 5, a shared LB/HB signal route 115 and a separate MB signal route 116 are provided between the diversity module 80 and the antenna switch module 103. Although illustrated in schematic form, the signal routes can include PCB trace and/or cables. Thus, using a shared LB/HB signal route can reduce RF signal routing overhead relative to a configuration in which separate signal routes are provided for HB and LB signals.

As shown in FIG. 5, the antenna switch module 103 receives the combined LB/HB signal and the separate MB signal from the diversity module 80. Additionally, the antenna switch module 103 can provide a LB diversity signal, a MB diversity signal, and a HB diversity signal to a transceiver using the LB diversity terminal LB_D, the MB diversity terminal MB_D, and the HB diversity terminal HB_D, respectively. Furthermore, the transceiver and the antenna switch module 103 are electrically coupled to one another using the LB primary terminal LB_P, the MB primary terminal MB_P, and the HB primary terminal HB_P, which can be used to transmit or receive signals associated with primary communications using the primary antennas 101, 102.

The first SP3T switch 105 and the first and second SPST switches 111, 112 of the antenna switch module 103 can be set to receive desired HB and LB diversity signals. For example, when a transceiver receives both HB and LB diversity signals, the first and second SPST switches 111, 112 can be closed, and the first SP3T switch 105 can be used to electrically connect the first diversity input terminal IN1_D to an input of the diplexer LB/HB diplexer 107. Additionally, when the transceiver receives the HB diversity signal but not the LB diversity signal, the first and second SPST switches 111, 112 can be opened, and the first SP3T switch 105 can be set to electrically connect the first diversity input terminal IN1_D to the HB diversity terminal HB_D. Furthermore, when the transceiver receives the LB diversity signal but not the HB diversity signal, the first and second SPST switches 111, 112 can be opened, and the first SP3T switch 105 can be set to electrically connect the first diversity input terminal IN1_D to the LB diversity terminal LB_D.

The second SP3T switch 106 and the third and fourth SPST switches 113, 114 of the antenna switch module 103 can be set to control primary signal communications over the combined MB/HB primary antenna 102.

Additional details of the RF system 100 can be similar to those described earlier.

Figure 6:
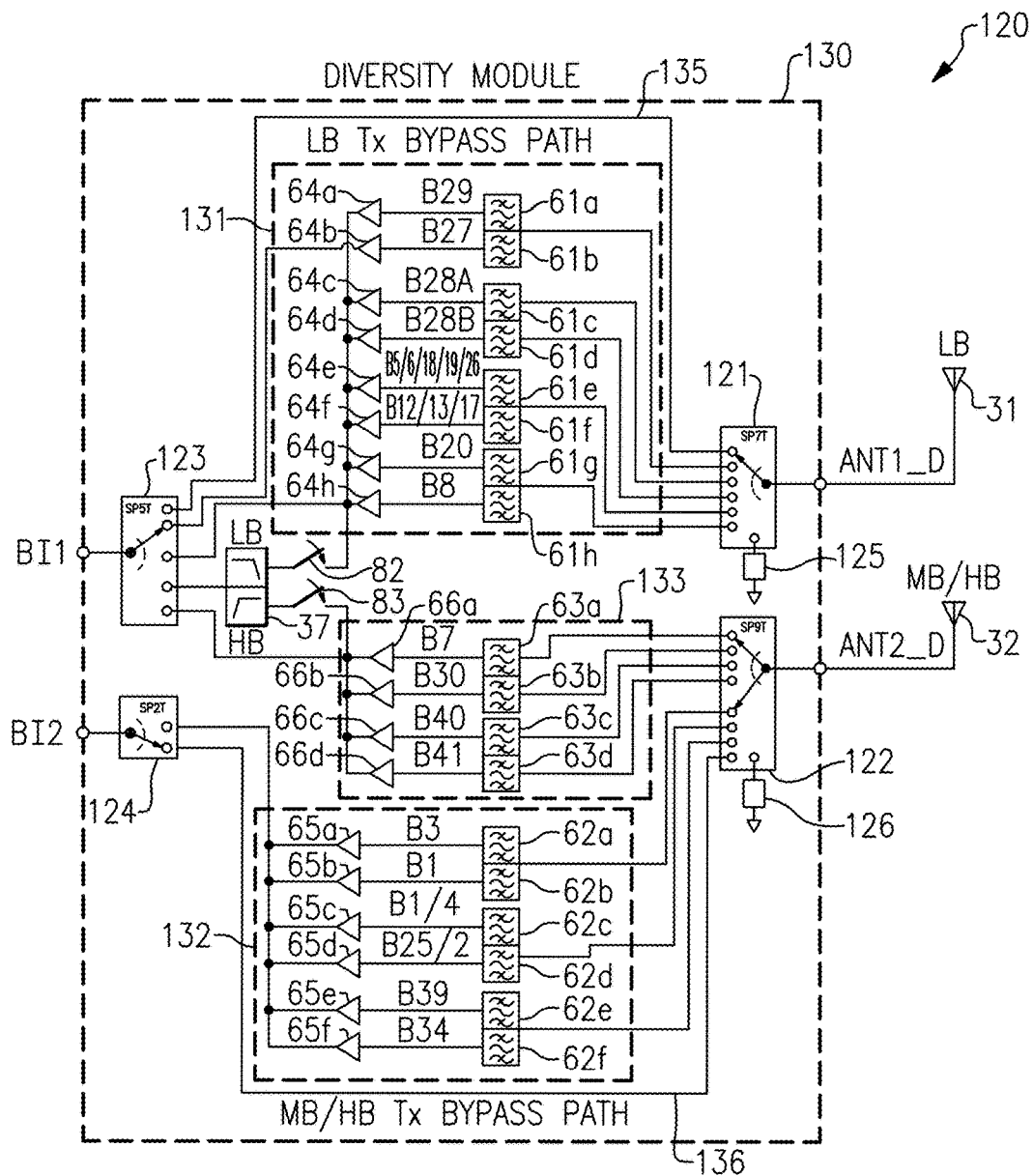
FIG. 6 is a schematic block diagram of an RF system according to another embodiment.

FIG. 6 is a schematic block diagram of an RF system 120 according to another embodiment. The RF system 120 includes the LB diversity antenna 31, the combined MB/HB diversity antenna 32, and a diversity module 130.

The diversity module 130 includes a single pole seven throw (SP1T) switch 121, a single pole nine throw (SP9T) band selection switch 122, a single pole five throw (SP5T) switch 123, a single pole two throw (SP2T) switch 124, a first impedance 125, a second impedance 126, the LB/HB diplexer 37, the first and second SPST switches 82, 83, a LB processing circuit 131, a MB processing circuit 132, and a HB processing circuit 133. The LB processing circuit 131 includes first to eighth LB filters 61a-61h and first to eighth LB LNAs 64a-64h. The MB processing circuit 132 includes first to sixth MB filters 62a-62f and first to sixth MB LNAs 65a-65f. The HB processing circuit 133 includes first to fourth HB filters 63a-63d and first to fourth HB LNAs 66a-66d. The diversity module 130 further includes a first bidirectional terminal BI1, a second bidirectional terminal BI2, a first diversity antenna terminal ANT1_D, and a second diversity antenna terminal ANT2_D.

In the illustrated configuration, the diversity module 130 is operable in a swap mode in which the LB diversity antenna 31 is used for transmitting primary LB signals and in which the combined MB/HB diversity antenna 32 is used for transmitting primary MB/HB signals. Implementing the diversity module 130 with a swap mode can enhance the performance of a mobile device by allowing the mobile device to selectively use diversity antenna(s) for primary transmissions when, for instance, the primary antenna(s) are blocked or obstructed. For example, a mobile device may be set by a user on a surface in a manner that blocks or obstructs the primary antenna(s) such that performance can be enhanced by transmitting signals via the diversity antenna (s).

The SP7T switch 121 can be used to connect the LB diversity antenna 31 to the first impedance 125, or to the first bidirectional terminal BI1 via a LB bypass path 135 through the SP5T switch 123, or to various LB filters 61a-61h associated with different low frequency bands. By setting the SP7T switch 121 and the SP5T switch 123 to select the LB bypass path 135, a primary LB transmit signal can be provided to the LB diversity antenna 31 during the swap mode. When operated in this manner, the first bidirectional terminal BI1 receives a primary transmit signal. However, when the diversity module 130 does not operate in the swap mode, the diversity module 130 can use the first bidirectional terminal BI1 as a shared LB/HB diversity terminal. Accordingly, in the illustrated configuration, the first bidirectional terminal BI1 can operate with bidirectional signal flow.

The SP9T band selection switch 122 can be used to electrically connect the combined MB/HB diversity antenna 32 to the second impedance 126, or to the second bidirectional terminal BI2 via a MB/HB bypass path 136 through the SP2T switch 124. When the SP9T band selection switch 122 and the SP2T switch 124 are used to select the MB/HB bypass path 136 during the swap mode, a primary MB/HB transmit signal can be provided to the combined MB/HB diversity antenna 32.

Additionally, the SP9T band selection switch 122 can be used to electrically connect the combined MB/HB diversity antenna 32 to various MB filters 62a-62f associated with different mid frequency bands and/or to various HB filters 63a-63d associated with different high frequency bands. In the illustrated configuration, the SP9T band selection switch 122 can provide a receive signal from the combined MB/HB diversity antenna 32 to both MB and HB filters at the same time if desired. Configuring the SP9T band selection switch 122 to include a state in which the receive signal from the combined MB/HB diversity antenna 32 is provided to both MB filters and HB filters can aid in providing carrier aggregation in a manner similar to that described earlier. In the illustrated configuration, the second bidirectional terminal BI2 can operate with bidirectional signal flow.

In the illustrated configuration, the first LB filter 61a filters Band 29, the second LB filter 61b filters Band 27, the third LB filter 61c filters Band 28 Block A, the fourth LB filter 61d filters Band 28 Block B, the fifth LB filter 61e filters Band 5, Band 6, Band 18, Band 19, and Band 26, the sixth LB filter 61f filters Band 12, Band 13, and Band 17, the seventh LB filter 61g filters Band 20, and the eighth LB filter 61h filters Band 8. Additionally, the first MB filter 62a filters Band 3, the second MB filter 62b filters Band 1, the third MB filter 62c filters Band 1 and Band 4, the fourth MB filter 62d filters Band 25 and Band 2, the fifth MB filter 62e filters Band 39, and the sixth MB filter 62f filters Band 34. Furthermore, the first HB filter 63a filters Band 7, the second HB filter 63b filters Band 30, the third HB filter 63c filters Band 40, and the fourth HB filter 63d filters Band 41.

Although one example of possible LB, MB, and HB filters and bands has been provided, other configurations are possible.

The diversity module 130 illustrates that in certain configurations, a diversity module can be configured to operate using multiple high frequency bands, multiple mid frequency bands, and/or multiple low frequency bands. Additionally, the LB/HB diplexer 37 can be used to combine a LB signal and a HB signal to generate a combined LB and HB signal that can be routed elsewhere in the RF system.

Figure 7:
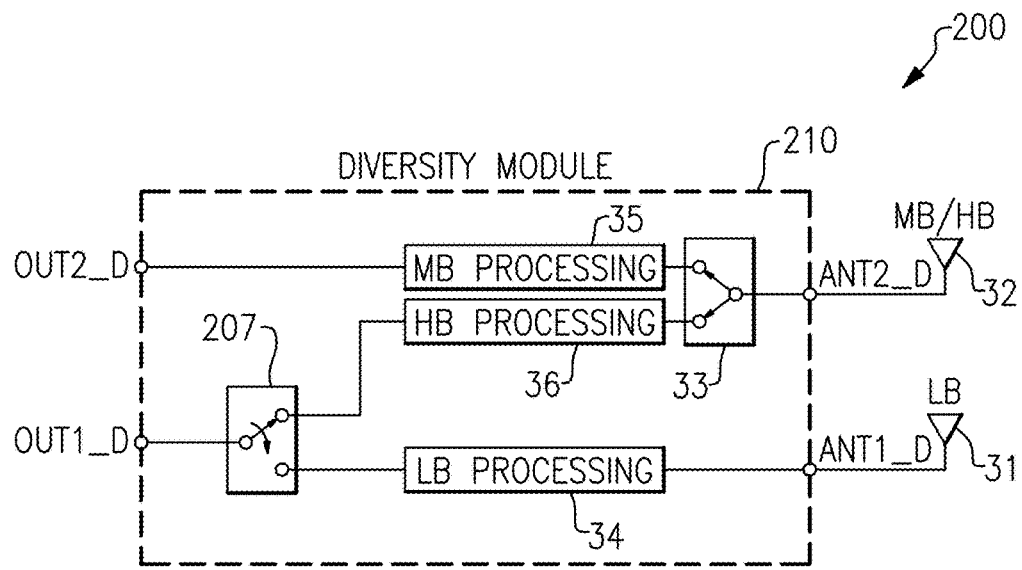
FIG. 7 is a schematic block diagram of an RF system according to another embodiment.

FIG. 7 is a schematic block diagram of an RF system 200 according to another embodiment. The RF system 200 includes a diversity module 210, the LB diversity antenna 31, and the combined MB/HB diversity antenna 32.

The diversity module 210 includes the band selection switch 33, the LB processing circuit 34, the MB processing circuit 35, the HB processing circuit 36, the first and second diversity antenna terminals, ANT1_D, ANT2_D, and the first and second diversity output terminals OUT1_D, OUT2_D, which can be as described earlier. Additionally, the diversity module 210 includes the SP2T switch 207.

The diversity module 210 of FIG. 7 is similar to the diversity module 30 of FIG. 2, except that the diversity module 210 of FIG. 7 omits the LB/HB diplexer 37 of FIG. 2 in favor of including the SP2T switch 207. As shown in FIG. 7, the SP2T switch 207 can be used to provide the LB signal generated by the LB processing circuit 34 or the HB signal generated by the HB processing circuit 36 to the first diversity output terminal OUT1_D, which operates as a shared LB/HB output terminal. Accordingly, rather than sending a combined LB/HB signal on the first diversity output terminal OUT1_D as shown for the diversity module 30 of FIG. 2, the illustrated configuration selects between LB and HB signals at a given time. For example, the SP2T switch 207 illustrates one example of a multi-throw switch that provides the LB signal to the first diversity output terminal OUT1_D in a first state and that provides the HB signal to the first diversity output terminal OUT1_D terminal in a second state.

The illustrated configuration can be used, for example, in configurations in which a mobile device's transceiver need not receive LB and HB signals from the LB diversity antenna 31 and MB/HB diversity antenna 32 at the same time.

Additional details of the diversity module 210 of FIG. 7 can be similar to those described earlier.

Examples of Diversity Modules with Low Intermodulation Distortion

Apparatus and methods for diversity modules are provided herein. In certain configurations, a diversity module includes a first antenna-side multi-throw switch, a second antenna-side multi-throw switch, a first transmitter-side multi-throw switch, a second transmitter-side multi-throw switch, a low band (LB) processing circuit, a mid band (MB) processing circuit, and a high band (HB) processing circuit. The LB processing circuit is electrically coupled in a first signal path between the first antenna-side multi-throw switch and the first transceiver-side multi-throw switch, the MB processing circuit is electrically coupled in a second signal path between the second transceiver-side multi-throw switch and the second transceiver-side multi-throw switch, and the HB processing circuit is electrically coupled in a third signal path between the second antenna-side multi-throw switch and the first transmitter-side multi-throw switch.

The diversity module can further include a first transmit bypass path, such as a LB transmit bypass path, that is selectable using the first transceiver-side multi-throw switch and the first antenna-side multi-throw switch. Additionally, the diversity module can further include a second transmit bypass path, such as a MB and/or HB transmit bypass path, that is selectable using the second transceiver-side multi-throw switch and the second antenna-side multi-throw switch. The first and/or second transmit bypass paths can be used during a swap mode in which diversity antenna(s) electrically coupled to the antenna-side multi-throw switches are used for primary signal transmissions.

Electrically coupling the HB processing circuit between the second antenna-side multi-throw switch and the first transmitter-side multi-throw switch can enhance the performance of the diversity module. For example, as will be described in detail further below, electrically coupling the HB processing circuit between the second antenna-side multi-throw switch and the first transmitter-side multi-throw switch can reduce or eliminate intermodulation at the output of the HB processing circuit associated with a MB and/or HB primary transmit signal. Accordingly, the diversity modules herein can exhibit enhanced performance, including smaller intermodulation distortion and/or greater isolation.

Figure 8:
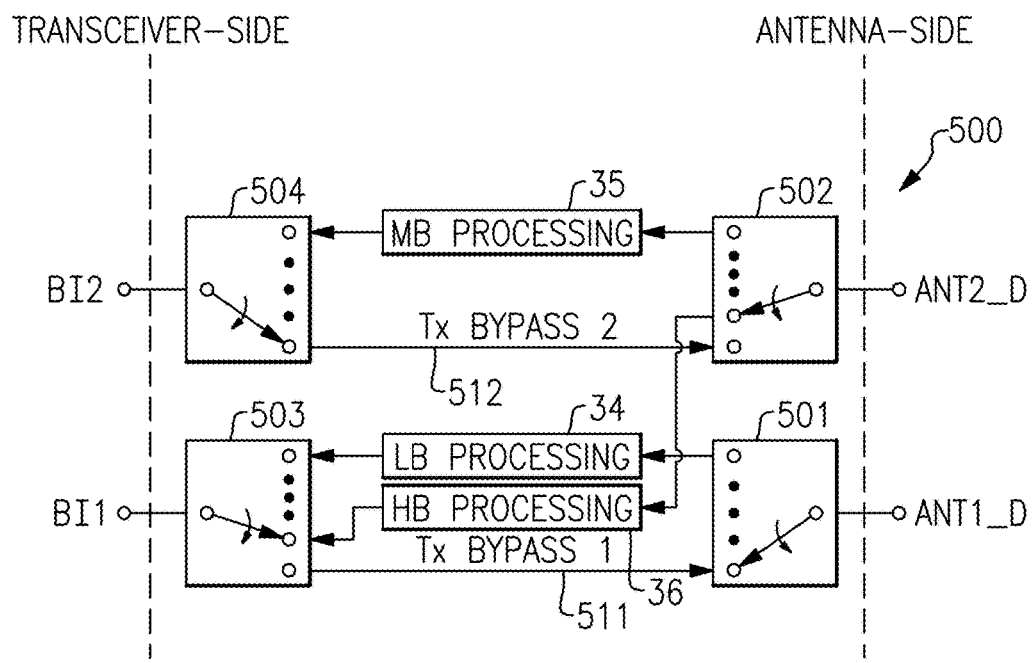
FIG. 8 is a schematic block diagram of a diversity module according to another embodiment.

FIG. 8 is a schematic block diagram of a diversity module 500 according to another embodiment. The diversity module 500 includes a first antenna-side multi-throw switch 501, a second antenna-side multi-throw switch 502, a first transceiver-side multi-throw switch 503, a second transceiver-side multi-throw switch 504, a LB processing circuit 34, a MB processing circuit 35, and a HB processing circuit 36. The diversity module 500 further includes a first diversity antenna terminal ANT1_D, a second diversity antenna terminal ANT2_D, a first bidirectional terminal BI1, and a second bidirectional terminal BI2.

The diversity module 500 can be electrically coupled to one or more diversity antennas via the first and second diversity antenna terminals ANT1_D, ANT2_D, which operate on an antenna-side of the diversity module 500. Additionally, the diversity module 500 can be electrically coupled to a transceiver (for example, by way of an antenna switch module) via the first and second bidirectional terminals BI1, BI2, which operate on a transceiver-side of the diversity module 500.

As shown in FIG. 8, the first antenna-side multi-throw switch 501 is electrically coupled to the first diversity antenna terminal ANT1_D, the second antenna-side multi-throw switch 502 is electrically coupled to the second diversity antenna terminal ANT2_D, the first transceiver-side multi-throw switch 503 is electrically coupled to the first bidirectional terminal BI1, and the second transceiver-side multi-throw switch 504 is electrically coupled to the second bidirectional terminal BI2.

The LB processing circuit 34 is electrically coupled in a first signal path between the first antenna-side multi-throw switch 501 and the first transceiver-side multi-throw switch 503. When the states of the first antenna-side multi-throw switch 501 and the first transceiver-side multi-throw switch 503 are set to select the LB processing circuit 34, the LB processing circuit 34 can process a diversity signal received on the first diversity antenna terminal ANT1_D to generate a LB signal on the first bidirectional terminal BI1.

The MB processing circuit 35 is electrically coupled in a second signal path between the second antenna-side multi-throw switch 502 and the second transceiver-side multi-throw switch 504. When the states of the second antenna-side multi-throw switch 502 and the second transceiver-side multi-throw switch 504 are set to select the MB processing circuit 35, the MB processing circuit 35 can process a diversity signal received on the second diversity antenna terminal ANT2_D to generate a MB signal on the second bidirectional terminal BI2.

The HB processing circuit 36 is electrically coupled in a third signal path between the second antenna-side multi-throw switch 502 and the first transceiver-side multi-throw switch 503. When the states of the second antenna-side multi-throw switch 502 and the first transceiver-side multi-throw switch 503 are set to select the HB processing circuit 36, the HB processing circuit 36 can process a diversity signal received on the second diversity antenna terminal ANT2_D to generate a HB signal on the first bidirectional terminal BI1.

The illustrated diversity module 500 further includes a first transmit bypass path 511 between the first antenna-side multi-throw switch 501 and the first transceiver-side multi-throw switch 503. When the states of the first antenna-side multi-throw switch 501 and the first transceiver-side multi-throw switch 503 are set to select the first transmit bypass path 511, a transmit signal received on the first bidirectional terminal BI1 can be provided to the first diversity antenna terminal ANT1_D. The illustrated diversity module 500 further includes a second transmit bypass path 512 between the second antenna-side multi-throw switch 502 and the second transceiver-side multi-throw switch 504. When the states of the second antenna-side multi-throw switch 502 and the second transceiver-side multi-throw switch 504 are set to select the second transmit bypass path 512, a transmit signal received on the second bidirectional terminal BI2 can be provided to the second diversity antenna terminal ANT2_D.

The first and second transmit bypass paths 511, 512 can be used during a swap mode of the diversity module 500 to allow a transceiver to transmit primary signals using diversity antenna(s). For example, in one embodiment, the first transmit bypass path 511 can be used by the transceiver to transmit a LB primary transmit signal during the swap mode, and the second transmit bypass path 512 can be used by the transceiver to transmit a MB and/or HB primary transmit signal during the swap mode. Implementing a diversity module with a swap mode can enhance the performance of a mobile device by allowing a transceiver to transmit via diversity antenna(s) when communication via primary antenna(s) is compromised, such as when the primary antenna(s) are blocked or obstructed.

Although FIG. 8 illustrates certain signal paths between the multi-throw switches, the multi-throw switches can be adapted to provide selection of additional paths. For example, with reference back to FIG. 6, multi-throw switches can be used for selection of multiple low bands, multiple mid bands, and/or multiple high bands. Furthermore, the diversity module can be adapted to include additional structures, such as additional circuitry or terminals.

In the illustrated configuration, the HB processing circuit 36 is electrically coupled in a signal path between the second antenna-side multi-throw switch 502 and the first transceiver-side multi-throw switch 503. As will be described in detail further below, configuring the HB processing circuit 36 in this manner can enhance performance of the diversity module 500 by inhibiting high frequency transmit leakage from reaching the output of the HB processing circuit 36 and generating intermodulation.

Additional details of the diversity module 500 can be similar to those described earlier.

Figure 9A:
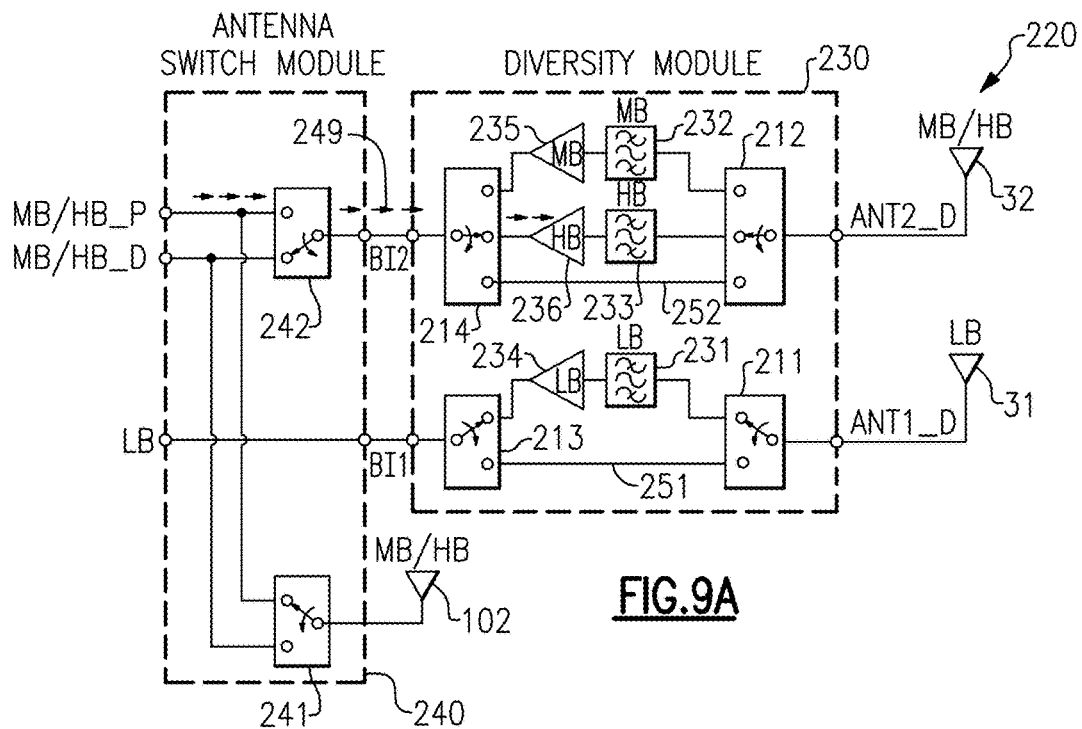
FIGS. 9A and 9B are schematic block diagrams of RF systems.

FIG. 9A is a schematic block diagram of one example of an RF system 220. The RF system 220 includes a diversity module 230, an antenna switch module 240, the LB diversity antenna 31, the combined MB/HB diversity antenna 32, and a combined MB/HB primary antenna 102.

The diversity module 230 includes an antenna-side SP2T switch 211, an antenna-side SP3T switch 212, a transceiver-side SP2T switch 213, and a transceiver-side SP3T switch 214. The diversity module 230 further includes a LB processing circuit including a LB filter 231 and a LB LNA 234. The diversity module 230 further includes a MB processing circuit including a MB filter 232 and a MB LNA 235. The diversity module 230 further includes a HB filter 233 and a HB LNA 236. The diversity module 230 further includes a first bidirectional terminal BI1, a second bidirectional terminal BI2, a first diversity antenna terminal ANT1_D electrically coupled to the LB diversity antenna 31, and a second diversity antenna terminal ANT2_D electrically coupled to the combined MB/HB diversity antenna 32.

As shown in FIG. 9A, the LB processing circuit is electrically coupled in a first signal path between the antenna-side SP2T switch 211 and the transceiver-side SP2T switch 213. Additionally, the MB processing circuit is electrically coupled in a second signal path between the antenna-side SP3T switch 212 and the transceiver-side SP3T switch 214. Furthermore, the HB processing circuit is electrically coupled in a third signal path between the antenna-side SP3T switch 212 and the transceiver-side SP3T switch 214. The illustrated diversity module 230 further includes a LB transmit bypass path 251 between the antenna-side SP2T switch 211 and the transceiver-side SP2T switch 213, and a MB/HB transmit bypass path 252 between the antenna-side SP3T switch 212 and the transceiver-side SP3T switch 214.

The antenna switch module 240 includes a first SP2T switch 241 and a second SP2T switch 242. The antenna switch module 240 further includes a primary antenna terminal electrically coupled to the combined MB/HB primary antenna 102, a first bidirectional terminal BI1 electrically coupled to the first bidirectional terminal BI1 of the diversity module 230, and a second bidirectional terminal BI2 electrically coupled to the second bidirectional terminal BI2 of the diversity module 230. The antenna switch module 240 further includes a primary MB and HB terminal MB/HB_P, a diversity MB and HB terminal MB/HB_D, and a LB terminal LB.

In certain configurations, it can be desirable for a mobile device to transmit signals using one or more diversity antennas. For example, certain mobile devices can be configured such that the mobile device may include a swap mode in which a primary LB signal, a primary MB signal, and/or a primary HB signal is transmitted using one or more diversity antennas.

For example, when in the swap mode, the second SP2T switch 242, the transceiver-side SP3T switch 214, and the antenna-side SP3T switch 212 can be used to select the MB/HB transmit bypass path 252 and to electrically connect the MB/HB_P terminal to the combined MB/HB diversity antenna 32. Additionally, when in the swap mode, the transceiver-side SP2T switch 213 and the antenna-side SP2T switch 211 can be used to select the LB transmit bypass path 251 and to electrically connect the LB terminal to the LB diversity antenna 31.

Although configuring an RF system to include a swap mode can provide flexibility in transmission and reception of primary and diversity signals, such an implementation may also degrade performance.

For instance, when the RF system 220 is in a normal operating mode (not in the swap mode), the RF system 220 may receive a HB diversity signal on the combined MB/HB diversity antenna 32 and transmit a HB primary signal on the combined MB/HB primary antenna 102. In such a configuration, the multi-throw switches of the antenna switch module 240 and the diversity module 230 can be set such that primary MB and HB terminal MB/HB_P is electrically coupled to the combined MB/HB primary antenna 102, and such that the diversity MB and HB terminal MB/HB_D terminal is electrically coupled to the output of the HB LNA 236.

When the multi-throw switches of the antenna switch module 240 and the diversity module 230 are set in this manner, finite switch isolation can lead to transmit leakage 249 through the second SP2T switch 242, which can result in a portion of the transmit signal on the primary MB and HB terminal MB/HB_P reaching an output of the HB LNA 236. Since the transmit signal on the primary MB and HB terminal MB/HB_P can be generated by a power amplifier (see, for example, FIG. 1), the transmit signal can have a relatively large power, and the power associated with the transmit leakage 249 can be relatively large.

The transmit leakage 249 can lead to intermodulation at the output of the HB LNA 236. The intermodulation can associated with the transmit frequency of the transmit signal on the primary MB and HB terminal MB/HB_P and with a blocker or jammer frequency associated with the combined MB/HB diversity antenna 32.

To enhanced isolation and reduce the intermodulation caused by the transmit leakage 249, a filter can be included at the output of the HB LNA 236. However, such a filter may increase size and/or cost of the RF system.

Figure 9B:
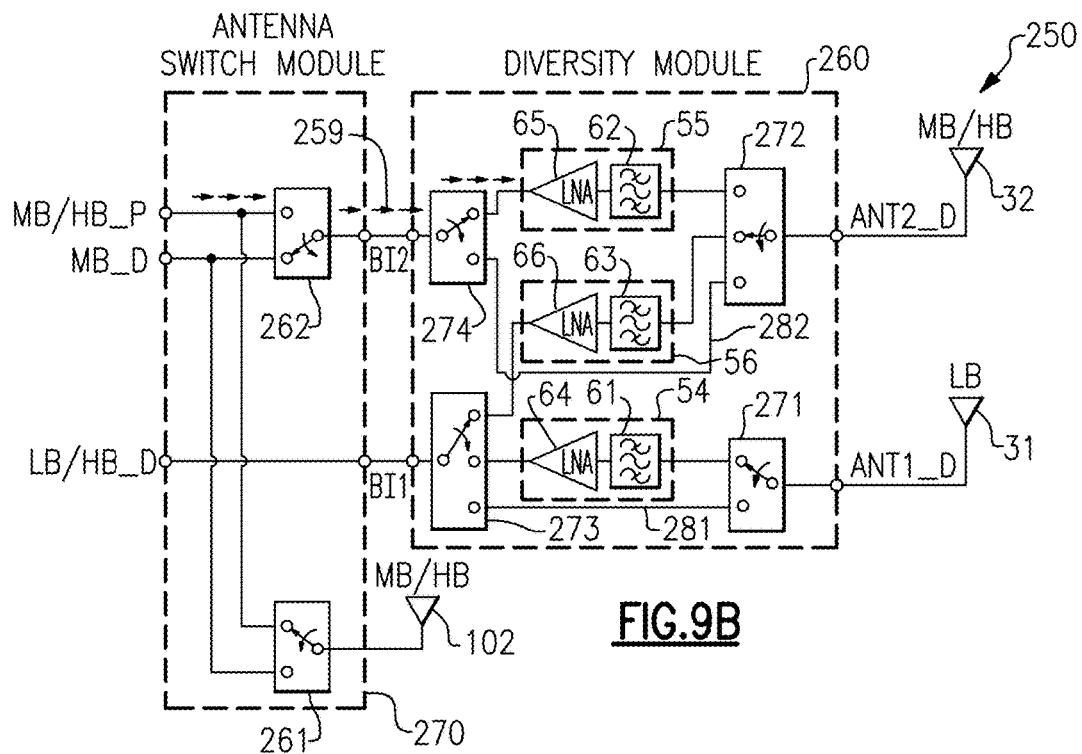

FIG. 9B is a schematic block diagram of one embodiment of an RF system 250. The RF system 250 includes a diversity module 260, an antenna switch module 270, the diversity LB diversity antenna 31, the combined MB/HB diversity antenna 32, and the combined MB/HB primary antenna 102.

The diversity module 260 includes an antenna-side SP2T switch 271, an antenna-side SP3T switch 272, a transceiver-side SP3T switch 273, and a transceiver-side SP2T switch 274. The diversity module 260 further includes the LB processing circuit 54, the MB processing circuit 55, and the HB processing circuit 56, which can be as described earlier. The diversity module 260 further includes a first diversity antenna terminal ANT1_D electrically coupled to the LB diversity antenna 31, a second diversity antenna terminal ANT2_D electrically coupled to the combined MB/HB diversity antenna 32, a first bidirectional terminal BI1, and a second bidirectional terminal BI2.

As shown in FIG. 9B, the LB processing circuit 54 is electrically coupled in a first signal path between the antenna-side SP2T switch 271 and the transceiver-side SP3T switch 273. Additionally, the MB processing circuit 55 is electrically coupled in a second signal path between the antenna-side SP3T switch 272 and the transceiver-side SP2T switch 274. Furthermore, the HB processing circuit 56 is electrically coupled in a third signal path between the antenna-side SP3T switch 272 and the transceiver-side SP3T switch 273. The illustrated diversity module 260 further includes a LB transmit bypass path 281 between the antenna-side SP2T switch 271 and the transceiver-side SP3T switch 273, and a MB/HB transmit bypass path 282 between the antenna-side SP3T switch 272 and the transceiver-side SP2T switch 274.

In the illustrated configuration, the antenna-side SP3T switch 272 can be used to provide a diversity signal received on the combined MB/HB diversity antenna 32 to an input of the MB processing circuit 55 or to an input of the HB processing circuit 56. When the diversity module 260 is operating in a swap mode, the antenna-side SP3T switch 272 can also be used to provide a MB/HB primary transmit signal to the combined MB/HB diversity antenna 32 via the MB/HB transmit bypass path 282. The transceiver-side SP2T switch 274 can be used to provide the MB signal generated by the MB processing circuit 55 to the diversity module's second bidirectional terminal BI2. Additionally, when the diversity module 260 is operating in the swap mode, the transceiver-side SP2T switch 274 can be used to electrically connect the second bidirectional terminal BI2 to the MB/HB transmit bypass path 282.

The antenna-side SP2T switch 271 can be used to provide a diversity signal received on the LB diversity antenna 31 to an input of the LB processing circuit 54. When the diversity module 260 is operating in the swap mode, the antenna-side SP2T switch 271 can also be used to provide a LB primary transmit signal to the LB diversity antenna 31 via the LB transmit bypass path 281. The transceiver-side SP3T switch 273 can be used to provide the HB signal generated by the HB processing circuit 56 to the first bidirectional terminal BI1 or to provide the LB signal generated by the LB processing circuit 54 to the first bidirectional terminal BI1. Additionally, when the diversity module 260 is operating in the swap mode, the transceiver-side SP3T switch 273 can be used to electrically connect the first bidirectional terminal BI1 to the LB transmit bypass path 281.

The antenna switch module 270 includes a first SP2T switch 261 and a second SP2T switch 262. The antenna switch module 270 further includes a primary antenna terminal electrically coupled to the combined MB/HB primary antenna 102, a first bidirectional terminal BI1 electrically coupled to the first bidirectional terminal BI1 of the diversity module 260, and a second bidirectional terminal BI2 electrically coupled to the second bidirectional terminal BI2 of the diversity module 260. The antenna switch module 270 further includes a primary MB and HB terminal MB/HB_P, a diversity LB and HB terminal LB/HB_D, and a diversity MB terminal MB_D.

During a normal operating mode of the RF system 250 (not in the swap mode), the RF system 250 may receive a HB diversity signal on the combined MB/HB diversity antenna 32 and transmit a HB primary signal on the combined MB/HB primary antenna 102. When the switches of the antenna switch module 270 and the diversity module 260 are set in this manner, finite switch isolation can lead to transmit leakage 259 through the second SP2T switch 262.

However, in contrast to the RF system 220 of FIG. 9A, the RF system 250 of FIG. 9B can avoid intermodulation associated with the transmit leakage 259 reaching an output of a HB LNA. For example, the diversity module 260 of FIG. 9B provides the HB signal generated by the HB processing circuit 56 to the second SP3T switch 273, which in turn is electrically coupled to the diversity LB and HB terminal LB/HB_D of the antenna switch module 260. Configuring the RF system in this manner can prevent the transmit leakage 259 from reaching the output of HB LNA 66. Although the transmit leakage 259 can reach the output of the MB LNA 65, intermodulation can be exacerbated at high band frequencies relative to mid band frequencies.

Accordingly, the performance impact associated with the transmit leakage 259 reaching the output of the MB LNA 65 is significantly less than the performance impact associated with the transmit leakage 259 reaching the output of the HB LNA 66.

Additional details of the RF system 250 can be similar to those described earlier.

Figure 10:
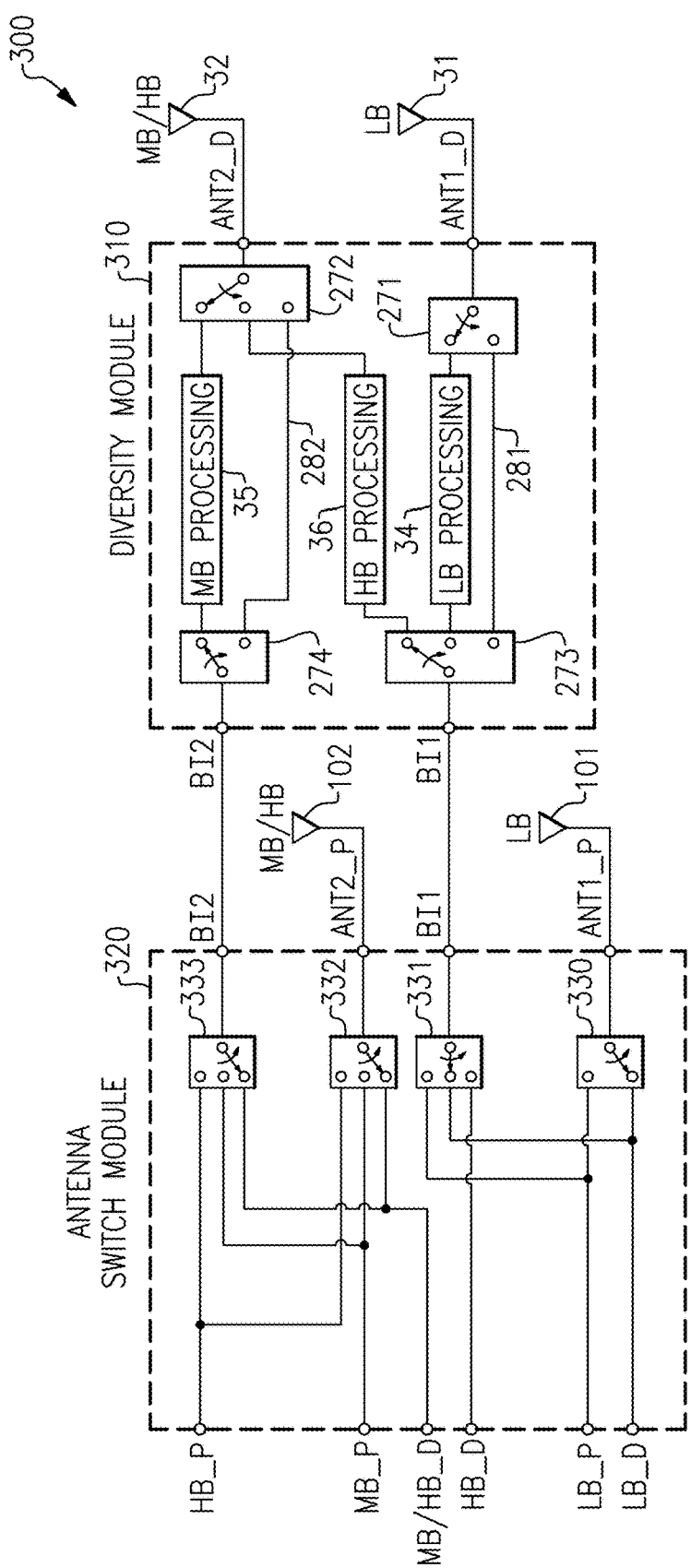
FIG. 10 is a schematic block diagram of another embodiment of an RF system including a diversity module and an antenna switch module.

FIG. 10 is a schematic block diagram of another embodiment of an RF system 300. The RF system 300 includes a diversity module 310, an antenna switch module 320, the LB diversity antenna 31, the combined MB/HB diversity antenna 32, the LB primary antenna 101, and the combined MB/HB primary antenna 102.

The diversity module 310 of FIG. 10 is similar to the diversity module 260 of FIG. 9B, except that the diversity module 260 includes a different implementation of LB, MB, and HB processing circuits. In particular, the diversity module 310 of FIG. 10 includes the LB processing circuit 34, the MB processing circuit 35, and the HB processing circuit 36, respectively.

The illustrated antenna switch module 320 includes a SP2T switch 330, a first SP3T switch 331, a second SP3T switch 332, a third SP3T switch 333. The antenna switch module 320 further includes a first primary antenna terminal ANT1_P electrically coupled to the LB primary antenna 101, a second primary antenna terminal ANT2_P electrically coupled to the combined MB/HB primary antenna 102, a first bidirectional terminal BI1 electrically coupled to the first bidirectional terminal BI1 of the diversity module 310, a second bidirectional terminal BI2 electrically coupled to the second bidirectional terminal BI2 of the diversity module 310, a primary HB terminal HB_P, a primary MB terminal MB_P, a primary LB terminal LB_P, a diversity HB terminal HB_D, a shared diversity MB/HB terminal MB/HB_D, and a diversity LB terminal LB_D.

As shown in FIG. 10, the first SP3T switch 331 can be used to electrically connect the first bidirectional terminal BI1 to the primary LB terminal LB_P, to the diversity LB terminal LB_D, or to the diversity HB terminal HB_D. Additionally, the second SP3T switch 332 can be used to electrically connect the combined MB/HB primary antenna 102 to the primary HB terminal HB_P, to the primary MB terminal MB_P, or to the shared diversity MB/HB terminal MB/HB_D. Furthermore, the third SP3T switch 333 can be used to electrically connect the second bidirectional terminal BI2 to the primary MB terminal MB_P, to the primary HB terminal HB_P, or to the shared diversity MB/HB terminal MB/HB_D. Furthermore, the SP2T switch 330 can be used to electrically connect the LB primary antenna 101 to the primary LB terminal LB_P or to the diversity LB terminal LB_D.

Additional details of the RF system 300 of FIG. 10 can be similar to those described earlier.

Although the diversity module 260 of FIG. 9B and the diversity module 310 of FIG. 10 are not illustrated as including the LB/HB diplexer 37 shown in FIGS. 2-6, the diversity module 260 of FIG. 9B and/or the diversity module 310 of FIG. 10 can be adapted to include a LB/HB diplexer. For instance, in one embodiment, the second SP3T switch 273 of FIG. 10 is omitted in favor of including a SP2T switch, and a LB/HB diplexer is included for recombining an output of the LB processing circuit 34 and an output of the HB processing circuit 36 to generate a combined LB/HB signal that is provided to the SP2T switch. Furthermore, in certain configurations an antenna-side multi-throw switch can be implemented as a band selection switch that can select two or more bands at a time.

Although the RF modules described in FIGS. 2-10 are illustrated as including certain terminals and components, the teachings herein are applicable to other configurations. For example, the modules herein can include additional terminals and/or components which have been omitted from the Figures for clarity. For instance, in certain embodiments, circuitry and terminals of the module used in a receive direction are illustrated, while the module can be adapted to include additional circuitry associated with a transmit direction.

Applications

Some of the embodiments described above have provided examples in connection with mobile devices. However, the principles and advantages of the embodiments can be used for any other systems or apparatus that have needs for RF modules.

Such RF modules can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A diversity module for a mobile device, the diversity module comprising:
   a plurality of terminals including a first terminal and a second terminal;
   a low band processing circuit configured to generate a low band signal at a low band output based on one or more diversity signals;
   a mid band processing circuit configured to generate a mid band signal based on the one or more diversity signals and to provide the mid band signal to the second terminal, the mid band signal having a frequency content that is greater than a frequency content of the low band signal;
   a high band processing circuit configured to generate a high band signal at a high band output based on the one or more diversity signals, the high band signal having a frequency content that is greater than a frequency content of the mid band signal;
   a diplexer; and
   a multi-throw switch including a first throw coupled to the low band output via a first signal path bypassing the diplexer, a second throw coupled to the high band output via a second signal path bypassing the diplexer, and a third throw coupled to both the low band output and the high band output via the diplexer, the multi-throw switch configured to provide the low band signal to the first terminal in a first state, and to provide the high band signal to the first terminal in a second state.

2. The diversity module of claim 1 wherein the frequency content of the low band signal is less than 1 gigahertz, the frequency content of the mid band signal is between 1 gigahertz and 2.3 gigahertz, and the frequency content of the high band signal is greater than 2.3 gigahertz.

3. The diversity module of claim 1 wherein the diplexer is configured to combine the low band signal and the high band signal to generate a combined signal, the multi-throw switch further configured to provide the combined signal to the first terminal in a third state.

4. The diversity module of claim 3 further comprising a first switch electrically coupled between the high band output of the high band processing circuit and a first input of the diplexer, and a second switch electrically coupled between the low band output of the low band processing circuit and a second input of the diplexer.

5. The diversity module of claim 4 wherein the first and second switches are configured to close when the multi-throw switch operates in the third state and to open when the multi-throw switch operates in the first or second states.

6. The diversity module of claim 1 wherein the low band processing circuit includes a first filter and a first low noise amplifier arranged in a cascade, the mid band processing circuit includes a second filter and a second low noise amplifier arranged in a cascade, and the high band processing circuit includes a third filter and a third low noise amplifier arranged in a cascade.

7. The diversity module of claim 1 wherein the one or more diversity signals includes a low band diversity signal provided to an input of the low band processing circuit.

8. The diversity module of claim 7 wherein the one or more diversity signals further includes a combined diversity signal, the diversity module further comprising a band selection switch including an input that receives the combined diversity signal, a first output electrically coupled to an input of the mid band processing circuit, and a second output electrically coupled to an input of the high band processing circuit.

9. The diversity module of claim 1 wherein the low band processing circuit includes a plurality of low band filters having different frequency ranges, the mid band processing circuit includes a plurality of mid band filters having different frequency ranges, and the high band processing circuit includes a plurality of high band filters having different frequency ranges.

10. A method of diversity signal processing in a mobile device, the method comprising:
    generating a low band signal at a low band output based on one or more diversity signals using a low band processing circuit of a diversity module;
    generating a mid band signal based on the one or more diversity signals using a mid band processing circuit of the diversity module, the mid band signal having a frequency content that is greater than a frequency content of the low band signal;
    generating a high band signal at a high band output based on the one or more diversity signals using a high band processing circuit, the high band signal having a frequency content that is greater than a frequency content of the mid band signal; and
    sending a plurality of signals from the diversity module to an antenna switch module over a first signal route and a second signal route, including providing the low band signal to the first signal route in a first state of a multi-throw switch using a first throw coupled to the low band output via a first signal path bypassing a diplexer, providing the high band signal to the first signal route in a second state of the multi-throw switch using a second throw coupled to the high band output via a second signal path bypassing the diplexer, providing a diplexer output signal to the first signal route in a third state of the multi-throw switch using a third throw coupled to both the low band output and the high band output via the diplexer, and providing the mid band signal to the second signal route.

11. The method of claim 10 wherein sending the plurality of signals from the diversity module to the antenna switch module further includes combining the low band signal and the high band signal to generate a combined signal using the diplexer, and providing the combined signal to the first signal route in the third state.

12. The method of claim 10 wherein sending the plurality of signals from the diversity module to the antenna switch module further includes closing a first switch that is between the high band output of the high band processing circuit and a first input of the diplexer in the third state, and closing a second switch that is between the high band output of the low band processing circuit and a second input of the diplexer in the third state.

13. The method of claim 12 wherein sending the plurality of signals from the diversity module to the antenna switch module further includes opening the first and second switches when the multi-throw switch operates in the first or second states.

14. A mobile device comprising:
an antenna switch module;
at least one diversity antenna configured to receive one or more diversity signals; and
a diversity module electrically coupled to the antenna switch module via a first signal route and a second signal route, the diversity module including a low band processing circuit configured to generate a low band signal at a low band output based on the one or more diversity signals, a mid band processing circuit configured to generate a mid band signal based on the one or more diversity signals and to provide the mid band signal to the second signal route, a high band processing circuit configured to generate a high band signal at a high band output based on the one or more diversity signals, a diplexer, and a multi-throw switch including a first throw coupled to the low band output via a first signal path bypassing the diplexer, a second throw coupled to the high band output via a second signal path bypassing the diplexer, and a third throw coupled to both the low band output and the high band output via the diplexer, the multi-throw switch configured to provide the low band signal to the first signal route in a first state and to provide the high band signal to the first signal route in a second state, the mid band signal having a frequency content that is greater than a frequency content of the low band signal, and the high band signal having a frequency content that is greater than a frequency content of the mid band signal.

15. The mobile device of claim 14 wherein the frequency content of the low band signal is less than 1 gigahertz, the frequency content of the mid band signal is between 1 gigahertz and 2.3 gigahertz, and the frequency content of the high band signal is greater than 2.3 gigahertz.

16. The mobile device of claim 14 wherein the diplexer is configured to combine the low band signal and the high band signal to generate a combined signal, the multi-throw switch further configured to provide the combined signal to the first signal route in a third state.

17. The mobile device of claim 16 wherein the diversity module further includes a first switch electrically coupled between the high band output of the high band processing circuit and a first input of the diplexer, and a second switch electrically coupled between the low band output of the low band processing circuit and a second input of the diplexer.

18. The mobile device of claim 17 wherein the first and second switches are configured to close when the multi-throw switch operates in the third state and to open when the multi-throw switch operates in the first or second states.

19. The mobile device of claim 14 further comprising a transceiver electrically coupled to the diversity module via the antenna switch module.

20. The mobile device of claim 19 further comprising one or more primary antennas electrically coupled to the transceiver via the antenna switch module.

* * * * *